US010460744B2

(12) United States Patent
Huang et al.

(10) Patent No.: US 10,460,744 B2
(45) Date of Patent: Oct. 29, 2019

(54) METHODS, SYSTEMS, AND MEDIA FOR VOICE COMMUNICATION

(71) Applicant: Xinxiao Zeng, Shenzhen (CN)

(72) Inventors: Yiteng Huang, Bridgewater, NJ (US); Xinxiao Zeng, Shenzhen (CN)

(73) Assignee: Xinxiao Zeng, Shenzhen (CN)

( * ) Notice: Subject to any disclaimer, the term of this patent is extended or adjusted under 35 U.S.C. 154(b) by 106 days.

(21) Appl. No.: 15/504,655

(22) PCT Filed: Feb. 4, 2016

(86) PCT No.: PCT/CN2016/073553
§ 371 (c)(1),
(2) Date: Feb. 16, 2017

(87) PCT Pub. No.: WO2017/132958
PCT Pub. Date: Aug. 10, 2017

(65) Prior Publication Data
US 2018/0226086 A1 Aug. 9, 2018

(51) Int. Cl.
*H04R 3/00* (2006.01)
*H04R 1/40* (2006.01)
(Continued)

(52) U.S. Cl.
CPC ...... *G10L 21/0232* (2013.01); *G10L 21/0208* (2013.01); *H04R 1/406* (2013.01);
(Continued)

(58) Field of Classification Search
USPC .......... 381/66, 71.1, 92, 93, 94.1, 94.7, 333, 381/374, 386, 388
See application file for complete search history.

(56) References Cited

U.S. PATENT DOCUMENTS 6,438,247 B1 8/2002 Cipolla et al.
7,092,744 B2 8/2006 Rodemer et al.
(Continued)

FOREIGN PATENT DOCUMENTS

CN 101217828 A 7/2008
CN 102602358 A 7/2012
(Continued)

OTHER PUBLICATIONS

NPL document K.Rodemer, G.wessels 2011.*
(Continued)

*Primary Examiner* — Yosef K Laekemariam
(74) *Attorney, Agent, or Firm* — Metis IP LLC

(57) ABSTRACT

Methods, systems, and media for voice communication are provided. In some embodiments, a system for voice communication is provided, the system including: a first audio sensor that captures an acoustic input; and generates a first audio signal based on the acoustic input, wherein the first audio sensor is positioned between a first surface and a second surface of a textile structure. In some embodiments, the first audio sensor is positioned in a region located between the first surface and the second surface of the textile structure. In some embodiments, the first audio sensor is positioned in a passage located between the first surface and the second surface of the textile structure.

23 Claims, 17 Drawing Sheets

(51) Int. Cl.

| | |
|---|---|
| ***H04R 1/08*** | (2006.01) |
| ***H04R 3/12*** | (2006.01) |
| ***G10L 21/0232*** | (2013.01) |
| ***G10L 21/0208*** | (2013.01) |
| *G10L 15/08* | (2006.01) |
| *G10L 21/0216* | (2013.01) |

(52) U.S. Cl.

CPC ........ *H04R 3/005* (2013.01); *G10L 2015/088* (2013.01); *G10L 2021/02082* (2013.01); *G10L 2021/02166* (2013.01); *H04R 1/083* (2013.01); *H04R 3/12* (2013.01); *H04R 2201/023* (2013.01); *H04R 2201/401* (2013.01); *H04R 2201/403* (2013.01); *H04R 2201/405* (2013.01); *H04R 2410/05* (2013.01); *H04R 2430/23* (2013.01); *H04R 2499/13* (2013.01)

(56) References Cited

U.S. PATENT DOCUMENTS

| | | | |
|---|---|---|---|
| 7,576,642 B2 | 8/2009 | Rodemer | |
| 8,556,020 B2 | 10/2013 | Rodemer | |
| 9,443,532 B2 | 9/2016 | Giesbrecht | |
| 2007/0230712 A1 | 10/2007 | Belt et al. | |
| 2011/0125492 A1* | 5/2011 | Alves .................. | G10L 21/0272<br>704/207 |
| 2013/0070935 A1 | 3/2013 | Hui et al. | |
| 2014/0023199 A1* | 1/2014 | Giesbrecht .......... | G10L 21/0216<br>381/71.1 |
| 2014/0070957 A1 | 3/2014 | Longinotti-Buitoni et al. | |
| 2018/0103317 A1 | 4/2018 | Sassi et al. | |

FOREIGN PATENT DOCUMENTS

| | | |
|---|---|---|
| CN | 103067629 A | 4/2013 |
| CN | 104810021 A | 7/2015 |
| DE | 4010815 A1 | 10/1991 |

OTHER PUBLICATIONS

International Search Report for PCT/CN2016/073553 dated Sep. 29, 2016, 4 pages.

Written Opinion of the International Search Authority for PCT/CN2016/073553 dated Sep. 29, 2016, 4 pages.

K. Rodemer and G. Wessels, "Belt-mic for phone and in-vehicle communication pushing handsfree audio performance to the next level," in Advanced Microsystems for Automotive Applications, G. Meyer and J. Valldorf, Eds., Berlin, Germany: Springer, 2011, 9 pages.

V. Rajan, S. Rohde, G. Schmidt, and J.Withopf, "Signal processing for microphone arrays on seat belts," in Proc. 6th Biennial Workshop on DSP for In-Vehicle Systems, 2013, 8 pages.

G. M. Sessler and J. E. West, "Self-biased condenser microphone with high capacitance," J. Acoust. Soc. Am., vol. 34, pp. 1787-1788, Nov. 1962, 2 pages.

G. W. Elko, "Differential Microphone Arrays," in Autio Signal Processing for Next Generation Multimedia Communication Systems, Y. Huang and J. Benesty, Eds., Boston: Kluwer Academic Publishers, 2004, Chapter 2, pp. 11-65, 55 pages.

J. Benesty, T. Gaensler, D. R. Morgan, M. M. Sondhi, and S. L. Gay, Advances in Network and Acoustic Echo Cancellation. Berlin, Germany: Springer-Verlag, 2001, 11 pages.

K. Ochiai, T. Araseki, and T. Ogihara, "Echo canceler with two echo path models," IEEE Trans. Commun., vol. 25, pp. 589-595, Jun. 1977, 7 pages.

M. M. Sondhi, "Adaptive echo cancelation for voice signals," in Springer Handbook of Speech Processing, J. Benesty, M. M. Sondhi, and Y. Huang, EiCs, Berlin, Germany: Springer, 2007, Chapter 45, Part H, pp. 903-927, 25 pages.

J. Benesty, D. R. Morgan, and M. M. Sondhi, "A better understanding and an improved solution to the specific problems of stereophonic acoustic echo cancellation," IEEE Trans. Speech Audio Process., vol. 6, pp. 156-165, Mar. 1998, 4 pages.

Jacob Beriesty et al., Microphone Array Signal Processing, Springer Topics in Signal Processing, vol. 1 2008.

* cited by examiner

METHODS, SYSTEMS, AND MEDIA FOR VOICE COMMUNICATION

CROSS-REFERENCE TO RELATED APPLICATIONS

The present application is a U.S. national stage application under 35 U.S.C. § 371 of International Application No. PCT/CN2016/073553, filed on Feb. 4, 2016, which is hereby incorporated by reference herein in its entirety.

TECHNICAL FIELD

The present disclosure relates to methods, systems, and media for voice communication. In particular, the present disclosure relates to methods, systems, and media for providing voice communication utilizing a wearable device with embedded sensors.

BACKGROUND

Voice control applications are becoming increasingly popular. For example, electronic devices, such as mobile phones, automobile navigation systems, etc., are increasingly controllable by voice. More particularly, for example, with such a voice control application, a user may speak a voice command (e.g., a word or phrase) into a microphone, and the electronic device may receive the voice command and perform an operation in response to the voice command. It would be desirable to provide such voice control functionality to a user that may prefer a hands-free experience, such as a user that is operating a motor vehicle, aircraft, etc.

SUMMARY

Methods, systems, and media for voice communication are disclosed. In some embodiments, a system for voice communication is provided, the system comprising: a first audio sensor that captures an acoustic input; and generates a first audio signal based on the acoustic input, wherein the first audio sensor is positioned between a first surface and a second surface of a textile structure.

In some embodiments, the first audio sensor is a microphone fabricated on a silicon wafer.

In some embodiments, the microphone is a Micro Electrical-Mechanical System (MEMS) microphone.

In some embodiments, the first audio sensor is positioned in a region located between the first surface and the second surface of the textile structure.

In some embodiments, the first audio sensor is positioned in a passage located between the first surface and the second surface of the textile structure.

In some embodiments, the system further includes a second audio sensor that captures the acoustic input; and generates a second audio signal based on the acoustic input, wherein the textile structure comprises a second passage, and wherein at least a portion of the second audio sensor is positioned in the second passage.

In some embodiments, the first passage is parallel to the second passage.

In some embodiments, the first audio sensor and the second audio sensor forms a differential subarray of audio sensors.

In some embodiments, the system further includes a processor that generates a speech signal based on the first audio signal and the second audio signal.

In some embodiments, the textile structure include multiple layers. The multiple layers include a first layer and a second layer.

In some embodiments, at least one of the first audio sensor or the second audio sensor is embedded in the first layer of the textile structure.

In some embodiments, at least a portion of circuitry associated with the first audio sensor is embedded in the first layer of the textile structure.

In some embodiments, at least a portion of circuitry associated with the first audio sensor is embedded in the second layer of the textile structure.

In some embodiments, a distance between the first surface and the second surface of the textile structure is not greater than 2.5 mm.

In some embodiments the distance represents the maximum thickness of the textile structure.

In some embodiments, to generate the speech signal, the processor further: generates an output signal by combining the first audio signal and the second audio signal; and performs echo cancellation on the output signal.

In some embodiments, to perform the echo cancellation, the processor further: constructs a model representative of an acoustic path; and estimates a component of the output signal based on the model.

In some embodiments, the processor further: applies a delay to the second audio signal to generate a delayed audio signal; and combines the first audio signal and the delayed audio signal to generate the output signal.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
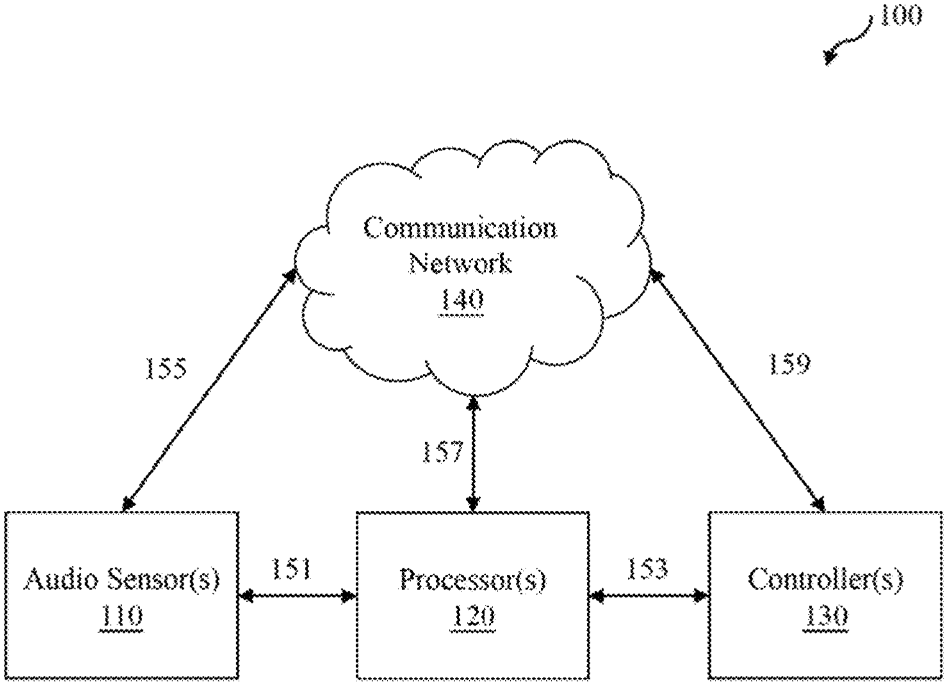
FIG. 1 illustrates an example of a system for voice communication in accordance with some embodiments of the disclosed subject matter.

In accordance with various implementations, as described in more detail below, mechanisms, which can include systems, methods, and media, for voice communication are provided.

In some embodiments, the mechanisms can provide a voice communication system utilizing a wearable device with embedded sensors. The wearable device may be and/or include any device that can be attached to one or more portions of a user. For example, the wearable device may be and/or include a seat belt, a safety belt, a film, a construction harness, a wearable computing device, a helmet, a helmet strap, a head-mounted device, a band (e.g., a wristband), the like, or any combination thereof.

The wearable device may include one or more textile structures in which one or more sensors may be embedded. As an example, a textile structure may be a wedding of a seatbelt, safety belt, etc. One or more of the embedded sensors can capture information about audio signals, temperatures, information about the pulse, blood pressure, heart rate, respiratory rate, electrocardiogram, electromyography, movement of an object, positioning information of a user, and/or any other information.

The textile structure may be made of any suitable material in which the sensor(s) may be embedded, such as fabrics (e.g., woven fabrics, nonwoven fabrics, conductive fabrics, non-conductive fabrics, etc.), webbings, fibers, textiles, reinforced film, plastics, plastic film, polyurethane, silicone rubber, metals, ceramics, glasses, membrane, paper, cardstock, polymer, polyester, polyimide, polyethylene terephthalate, flexible materials, piezoelectric materials, carbon nanotube, bionic material, and/or any other suitable material that may be used to manufacture a textile structure with embedded sensors. The textile structure may be made from conductive materials (e.g., conductive yarns, conductive fabrics, conductive treads, conductive fibers, etc.), non-conductive materials (e.g., non-conductive fabrics, non-conductive epoxy, etc.), and/or materials with any other electrical conductivity.

One or more sensors (e.g., microphones, biometric sensors, etc.) may be embedded textile structure. For example, a sensor may be positioned between a first surface and a second surface of the textile structure (e.g., an inner surface of a seatbelt that faces an occupant of a motor vehicle, an outer surface of the seatbelt, etc.). In a more particular example, the textile structure may include a passage that is located between the first surface and the second surface of the textile structure. The sensor and/or its associated circuitry may be positioned in the passage. One or more portions of the passage may be hollow. In another more particular example, one or more portions of the sensor and/or its associated circuitry may be positioned in a region of the textile structure that is located between the first surface and the second surface of the textile structure so that the sensor and its associated circuitry is completely embedded in the textile structure. As such, the presence of the embedded sensor may not have to change the thickness and/or appearance of the textile structure. The thickness of the textile structure may remain the same as that of a textile structure without embedded sensors. Both surfaces of the textile structure may be smooth.

The textile structure may have one or more layers. Each of the layers may include one or more audio sensors, circuitry and/or any other hardware associated with the audio sensor(s), processor(s), and/or any other suitable component. For example, one or more audio sensor(s) and their associated circuitry and/or hardware may be embedded in a first layer of the textile structure. As another example, one or more audio sensors may be embedded in the first layer of the textile structure. One or more portions of their associated circuitry may be embedded in one or more other layers of the textile structure (e.g., a second layer, a third layer, etc.).

In some embodiments, multiple audio sensors (e.g., microphones) may be embedded in the textile structure to facilitate voice communication. The audio sensors may be arranged to form an array of audio sensors (also referred to herein as the "microphone array"). The microphone array may include one or more subarrays of audio sensors (also referred to herein as the "microphone subarrays"). In some embodiments, the microphone subarrays may be placed along one or more longitudinal lines of the textile structure. For example, the microphone subarrays may be positioned in multiple passages of the textile structure that extend longitudinally along the textile structure. The passages may or may not be parallel to each other. The passages may be located at various positions of the textile structure.

A microphone subarray may include one or more audio sensors that are embedded in the textile structure. In some embodiments, the microphone subarray may include two audio sensors (e.g., a first audio sensor and a second audio sensor) that may form a differential directional microphone system. The first audio sensor and the second audio sensor may be arranged along a cross-section line of the textile structure, in some embodiments. The first audio sensor and the second audio sensor may generate a first audio signal and a second audio signal representative of an acoustic input (e.g., an input signal including a component corresponding to voice of a user). The first audio signal and the second audio signal may be processed to generate an output of the microphone subarray that has certain directional characteristics (using one or more beamforming, spatial filtering, and/or any other suitable techniques).

As will be described in more detail below, the output of the microphone subarray may be generated without information about geometry of the microphone subarray (e.g., particular locations of the first microphone and/or the second microphone as to the user) and/or the location of the sound source (e.g., the location of the user or the user's mouth). As such, the output of the microphone may be generated to achieve certain directional characteristics when the geometry of the microphone subarray changes (e.g., when the location of the user moves, when the textile structure bends, etc.).

In some embodiments, multiple microphone subarrays may be used to generate multiple output signals representative of the acoustic input. The mechanisms can process one or more of the output signals to generate a speech signal representative of a speech component of the acoustic input (e.g., the voice of the user). For example, the mechanisms can perform echo cancellation on one or more of the output signals to reduce and/or cancel echo and/or feedback components of the output signals. As another example, the mechanisms can perform multiple channel noise reduction on one or more of the output signals (e.g., one or more of the output signals corresponding to certain audio channels). As still another example, the mechanisms can perform residual noise and/or echo suppression on one or more of the output signals.

The mechanisms may further process the speech signal to provide various functionalities to the user. For example, the mechanisms may analyze the speech signal to determine content of the speech signal (e.g., using one or more suitable speech recognition techniques and/or any other signal processing technique). The mechanisms may then perform one or more operations based on the analyzed content of the speech signal. For example, the mechanisms can present media content (e.g., audio content, video content, images, graphics, text, etc.) based on the analyzed content. More particularly, for example, the media content may relate to a map, web content, navigation information, news, audio clips, and/or any other information that relates to the content of the speech signal. As another example, the mechanisms can make a phone call for the user using an application implementing the mechanisms and/or any other application. As still another example, the mechanisms can send, receive, etc. messages based on the speech signal. As yet another example, the mechanisms can perform a search for the analyzed content (e.g., by sending a request to a server that can perform the search).

Accordingly, aspects of the present disclosure provide mechanisms for implementing a voice communication system that can provide hands-free communication experience to a user. The voice communication system may be implemented in a vehicle to enhance the user's in-car experience.

These and other features for rewinding media content based on detected audio events are described herein in connection with FIGS. 1-16.

FIG. 1 illustrates an example 100 of a system for voice communication in accordance with some embodiments of the disclosed subject matter.

As illustrated, system 100 can include one or more audio sensor(s) 110, processor(s) 120, controller(s) 130, communication network 140, and/or any other suitable component for processing audio signals in accordance with the disclosed subject matter.

Audio sensor(s) 110 can be any suitable device that is capable of receiving an acoustic input, processing the acoustic input, generating one or more audio signals based on the acoustic input, processing the audio signals, and/or performing any other suitable function. The audio signals may include one or more analog signals and/or digital signals. Each audio sensor 110 may or may not include an analog-to-digital converter (ADC).

Each audio sensor 110 may be and/or include any suitable type of microphone, such as a laser microphone, a condenser microphone, a silicon microphone (e.g., a Micro Electrical-Mechanical System (MEMS) microphone), the like, or any combination thereof. In some embodiments, a silicon microphone (also referred to as a microphone chip) can be fabricated by directly etching pressure-sensitive diaphragms into a silicon wafer. The geometries involved in this fabrication process may be on the order of microns (e.g., $10^{-6}$ meters). Various electrical and/or mechanical components of the microphone chip may be integrated in a chip. The silicon microphone may include built-in analog-to-digital converter (ADC) circuits and/or any other circuitry on the chip. The silicon microphone can be and/or include a condenser microphone, a fiber optic microphone, a surface-mount device, and/or any other type of microphone.

One or more audio sensors 110 may be embedded into a wearable device that may be attached to one or more portions of a person. The wearable device may be and/or include a seatbelt, a safety belt, a film, a construction harness, a wearable computing device, a helmet, a helmet strap, a head-mounted device, a band (e.g., a wristband), the like, or any combination thereof.

Each of the audio sensors 110 may have any suitable size to be embedded in a textile structure of the wearable device. For example, an audio sensor 110 may have a size (e.g., dimensions) such that the audio sensor may be completely embedded in a textile structure of a particular thickness (e.g., a thickness that is not greater than 2.5 mm or any other threshold). More particularly, for example, the audio sensor may be positioned between a first surface and a second surface of the textile structure.

For example, one or more audio sensors 110 and their associated circuitry may be embedded into a textile structure so that the audio sensor 110 is positioned between a first surface and a second surface of the textile structure. As such, the presence of the embedded audio sensors may not have to change the thickness and/or the appearance of the textile structure. The thickness of the textile structure may remain the same as that of a textile structure without embedded sensors. Both surfaces of the textile structure may be smooth. More particularly, for example, one or more sensors may be embedded between two surfaces of the textile structure with no parts protruding from any portion of the textile structure. In some embodiments, the audio sensor may be embedded into the textile structure using one or more techniques as descried in conjunction with FIGS. 11-16 below.

Audio sensors 110 may have various directivity characteristics. For example, one or more audio sensors 110 can be directional and be sensitive to sound from one or more particular directions. More particularly, for example, an audio sensor 110 can be a dipole microphone, bi-directional microphone, the like, or any combination thereof. As another example, one or more of the audio sensors 110 can be non-directional. For example, the audio sensor(s) 110 can be an omnidirectional microphone.

In some embodiments, multiple audio sensors 110 can be arranged as an array of audio sensors (also referred to herein as a "microphone array") to facilitate voice communication. The microphone array may include one or more subarrays of audio sensors (also referred to herein as "microphone subarrays"). Each microphone subarray may include one or more audio sensors (e.g., microphones). A microphone subarray may form a differential directional microphone system pointing to a user of the wearable device (e.g., an occupant of a vehicle that wears a seatbelt). The microphone subarray may output an output signal representative of voice of the user. As will be discussed below in more detail, one or more output signals generated by one or more microphone subarrays may be combined, processed, etc. to generate a speech signal representative of the voice of the user and/or any other acoustic input provided by the user. In some embodiments, as will be discussed in more detail below, multiple audio sensors of the microphone arrays may be embedded in a textile structure (e.g., being placed between a first surface and a second surface of the textile structure).

Processor(s) 120 and/or any other device may process the speech signal to implement one or more voice control applications. For example, processor(s) 120 may analyze the speech signal to identify content of the speech signal. More particularly, for example, one or more keywords, phrases, etc. spoken by the user may be identified using any suitable speech recognition technique. Processor(s) 120 may then cause one or more operations to be performed based on the identified content (e.g., by generating one or more commands for performing the operations, by performing the operations, by providing information that can be used to perform the operations, etc.). For example, processor(s) 120 may cause media content (e.g., video content, audio content, text, graphics, etc.) to be presented to the user on a display. The media content may relate to a map, web content, navigation information, news, audio clips, and/or any other information that relates to the content of the speech signal. As another example, processor(s) 120 may cause a search to be performed based on the content of the speech signal (e.g., by sending a request to search for the identified keywords and/or phrases to a server, by controlling another device and/or application to send the request, etc.).

Processor(s) 120 can be any suitable device that is capable of receiving, processing, and/or performing any other function on audio signals. For example, processor(s) 120 can receive audio signals from one or more microphone subarrays and/or any other suitable device that is capable of generating audio signals. Processor(s) 120 can then perform spatial filtering, echo cancellation, noise reduction, noise and/or echo suppression, and/or any other suitable operation on the audio signals to generate a speech signal.

Processor(s) 120 may be and/or include any of a general purpose device, such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, a storage device (which can include a hard drive, a digital video recorder, a solid state storage device, a removable storage device, or any other suitable storage device), etc.

Figure 3:
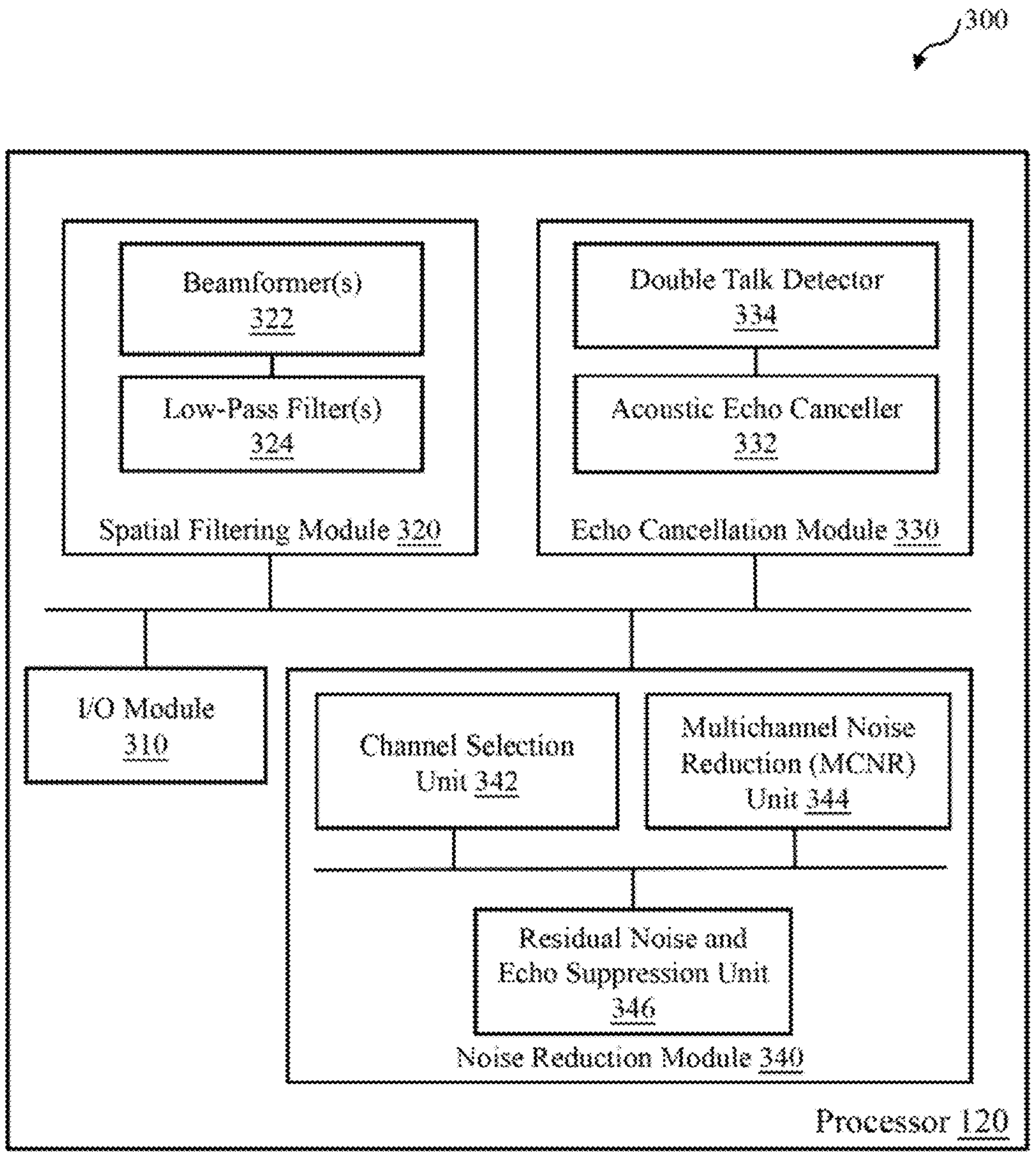
FIG. 3 illustrates an example of a processor in accordance with some embodiments of the disclosed subject matter.

In some embodiments, processor(s) 120 may be and/or include a processor as described in conjunction with FIG. 3. In some embodiments, processor(s) 120 may perform one or more operations and/or implement one or more of processes 700-1000 as described in conjunction with FIGS. 7-10 below.

Controller(s) 130 can be configured to control the functions and operations of one or more components of the system 100. The controller(s) 130 can be a separate control device (e.g., a control circuit, a switch, etc.), a control bus, a mobile device (e.g., a mobile phone, a tablet computing device, etc.), the like, or any combination thereof. In some other embodiments, controller(s) 130 may provide one or more user interfaces (not shown in FIG. 1) to get user commands. In some embodiments, the controller(s) 130 can be used to select one or more subarrays, processing methods, according to different conditions, such as velocity of the vehicle, noise of the circumstances, characteristic of the user (e.g., historical data of the user, user settings), characteristic of the space, the like, or any combination thereof.

In some embodiments, processor(s) 120 can be communicatively connected to audio sensor(s) 110 and controller(s) 130 through communication links 151 and 153, respectively. In some embodiments, each of audio sensor(s) 110, processor(s) 120, and controller(s) 130 can be connected to communication network 140 through communication links 155, 157, and 159, respectively. Communication links 151, 153, 155, 157, and 159 can be and/or include any suitable communication links, such as network links, dial-up links, wireless links, Bluetooth™ links, hard-wired links, any other suitable communication links, or a combination of such links.

Communication network 140 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a cable television network, a fiber optic network, a telephone network, a satellite network, or any combination of any of such networks.

In some embodiments, the audio sensor(s) 110, the processor(s) 120, and the controller(s) 130 can communicate with each other through the communication network 140. For example, audio signal can be transferred from the audio sensor(s) 110 to the processor(s) 120 for further processing through the communication network 140. In another example, control signals can be transferred from the controller(s) 130 to one or more of the audio sensor(s) 110 and the processor(s) 120 through the communication network 140.

In some embodiments, each of audio sensor(s) 110, processor(s) 120, and controller(s) 130 can be implemented as a stand-alone device or integrated with other components of system 100.

In some embodiments, various components of system 100 can be implemented in a device or multiple devices. For example, one or more of audio sensor(s) 110, processor(s) 120, and/or controller(s) 130 of system 100 can be embedded in a wearable device (e.g., a seatbelt, a film, etc.). As another example, the audio sensor(s) 110 can be embedded in a wearable device, while one or more of the processor(s) 120 and controller(s) 130 can be positioned in another device (e.g., a stand-alone processor, a mobile phone, a server, a tablet computer, etc.).

In some embodiments, system 100 can also include one or more biosensors that are capable of detecting one a user's heart rate, respiration rate, pulse, blood pressure, temperature, alcohol content in exhaled gas, fingerprints, electrocardiogram, electromyography, position, and/or any other information about the user. System 100 can be used as a part of a smart control device. For example, one or more control commands can be made according to a speech signal, as shown in FIG. 13B received by system 100, the like, or any combination thereof. In one embodiment, the speech signal can be acquired by system 100, and a mobile phone can be controlled to perform one or more functions (e.g., being turned on/off, searching a name in a phone book and making a call, writing a message, etc.). In another embodiment, alcohol content in exhaled gas can be acquired by system 100, and the vehicle can be locked when the acquired alcohol content exceeds a threshold (e.g., higher than 20 mg/100 ml, 80 mg/100 ml, etc.). In yet another embodiment, a user's heart rate or any other biometric parameter can be acquired by system 100, and an alert can be generated. The alert may be sent to another user (e.g., a server, a mobile phone of a health care provider, etc.) in some embodiments.

Figure 2A:
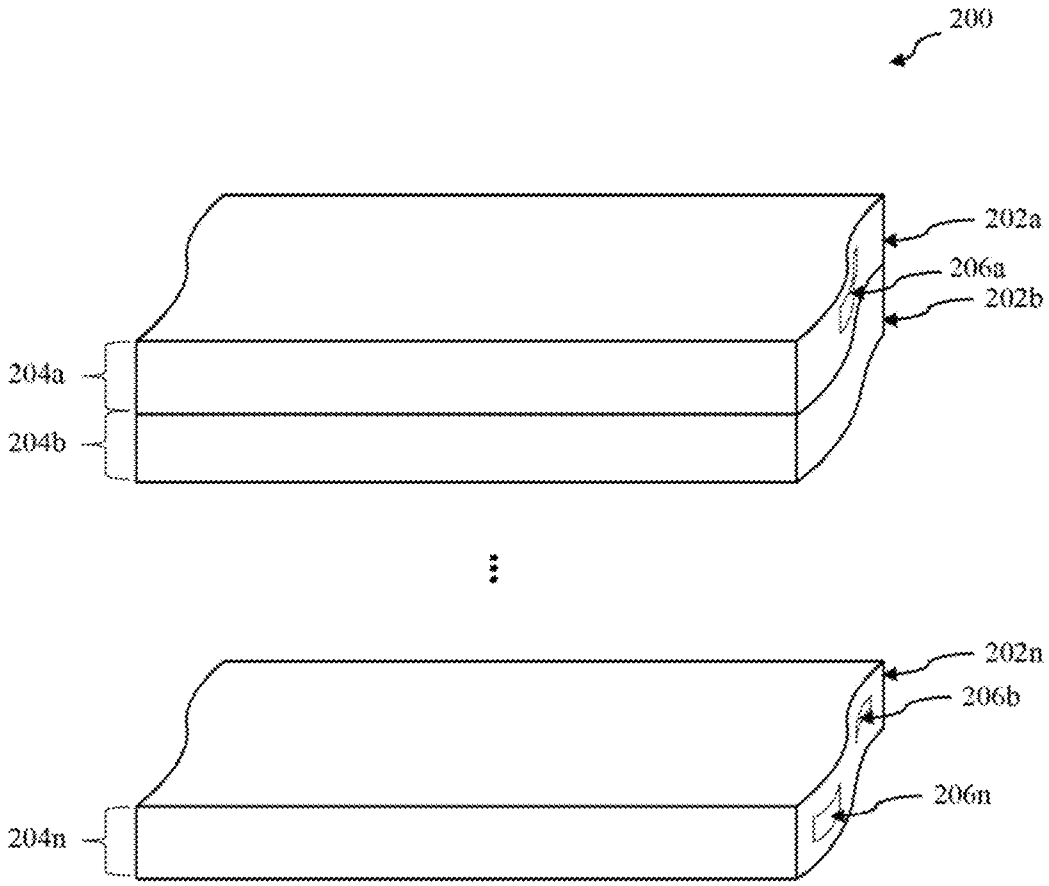
FIGS. 2A-B illustrate examples of textile structures with embedded sensors in accordance with some embodiments of the disclosed subject matter.

FIG. 2A illustrates an example 200 of a textile structure with embedded audio sensors in accordance with some embodiments of the disclosed subject matter. Textile structure 200 may be part of a wearable device.

As illustrated, textile structure 200 can include one or more layers (e.g., layers 202*a*, 202*b*, 202*n*, etc.). While three layers are illustrated in FIG. 2A, this is merely illustrative. Textile structure 200 may include any suitable number of layers (e.g., one layer, two layers, etc.).

Each of layers 202*a-n* may be regarded as being a textile structure in which audio sensors, circuitry and/or any other hardware associated with the audio sensor(s), etc. may be embedded. As shown in FIG. 2A, layers 202*a-n* may be arranged along a latitudinal direction.

Textile structure 200 and/or each of layers 202*a-n* may be made of any suitable material, such as fabrics (e.g., woven fabrics, nonwoven fabrics, conductive fabrics, non-conductive fabrics, etc.), webbings, fibers, textiles, reinforced film, plastics, plastic film, polyurethane, silicone rubber, metals, ceramics, glasses, membrane, paper, cardstock, polymer, polyester, polyimide, polyethylene terephthalate, flexible materials, piezoelectric materials, carbon nanotube, bionic material, and/or any other suitable material that may be used to manufacture a textile structure with embedded sensors. Textile structure 200 and/or each of layers 202*a-n* may be made from conductive materials (e.g., conductive yarns, conductive fabrics, conductive treads, conductive fibers, etc.), non-conductive materials (e.g., non-conductive fabrics, non-conductive epoxy, etc.), and/or materials with any other electrical conductivity. In some embodiments, multiple layers of substrate 200 may be made of the same or different material(s). The color, shape, density, elasticity, thickness, electrical conductivity, temperature conductivity, air permeability, and/or any other characteristic of layers 202*a-n* may be the same or different.

Each of layers 202*a-n* can have any suitable dimensions (e.g., a length, a width, a thickness (e.g., a height), etc.). Multiple layers of textile structure 200 may or may not have the same dimensions. For example, layers 202*a*, 202*b*, and 202*n* may have thicknesses 204*a*, 204*b*, and 204*n*, respectively. Thicknesses 204*a*, 204*b*, and 204*n* may or may not be the same as each other. In some embodiments, one or more layers of textile structure 200 can have a particular thickness. For example, the thickness of all the layers of textile structure 200 (e.g., a combination of thicknesses 204*a-n*) may be less than or equal to the particular thickness (e.g., 2.5 mm, 2.4 mm, 2 mm, 3 mm, 4 mm, and/or any other value of thickness). As another example, the thickness of a particular layer of textile structure 200 may be less than or equal to the particular thickness (e.g., 2.5 mm, 2.4 mm, 2 mm, 3 mm, 4 mm, and/or any other value of thickness).

In some embodiments, a thickness of a layer of a textile structure may be measured by a distance between a first surface of the layer and a second surface of the layer (e.g., thicknesses 204*a*, 204*b*, 204*n*, etc.). The first surface of the layer may or may not be parallel to the second surface of the layer. The thickness of the layer may be the maximum distance between the first surface and the second surface of the layer (also referred to herein as the "maximum thickness"). The thickness of the layer may also be any other distance between the first surface and the second surface of the layer.

Similarly, a thickness of a textile structure may be measured by a distance between a first surface of the textile structure and a second surface of the textile structure. The first surface of the textile structure may or may not be parallel to the second surface of the textile structure. The thickness of the textile structure may be the maximum distance between the first surface and the second surface of the textile structure (also referred to herein as the "maximum thickness"). The thickness of the textile structure may also be any other distance between the first surface and the second surface of the textile structure.

Textile structure 200 may be part of any suitable wearable device, such as a seat belt, a construction harness, a wearable computing device, a helmet, a helmet strap, a head-mounted device, a band (e.g., a wristband), a garment, a military apparel, etc. In some embodiments, textile structure 200 can be and/or include a seat belt webbing.

Each of layers 202*a-n* may include one or more audio sensors, circuitry and/or any other hardware associated with the audio sensor(s), processor(s), and/or any other suitable component for providing a communication system in a wearable device. For example, one or more audio sensor(s) and their associated circuitry and/or hardware may be embedded in a layer of textile structure 200. As another example, one or more audio sensors may be embedded in a given layer of textile structure 200 (e.g., a first layer). One or more portions of their associated circuitry may be embedded in one or more other layers of textile structure 200 (e.g., a second layer, a third layer, etc.). In some embodiments, each of layers 202*a-n* may be and/or include one or more textile structures as described in connection with FIGS. 2B and 11-14 below.

In some embodiments, multiple audio sensors embedded in one or more layers of textile structure 200 may form one or more arrays of audio sensors (e.g., "microphone arrays"), each of which may further include one or more subarrays of audio sensors (e.g., "microphone subarrays"). For example, a microphone array and/or microphone subarray may be formed by audio sensors embedded in a particular layer of textile structure 200. As another example, microphone array and/or microphone subarray may be formed by audio sensors embedded in multiple layers of textile structure 200. In some embodiments, multiple audio sensors may be arranged in one or more layers of textile structure 200 as described in connection with FIGS. 2B and 11-14 below.

In some embodiments, one or more of layers 202*a-n* may include one or more passages (e.g., passages 206*a*, 206*b*, 206*n*, etc.) in which audio sensors, circuitry associated with the audio sensor(s), processor(s), etc. may be embedded. For example, each of the passages may be and/or include one or more of passages 201*a-g* of FIG. 2B, passages 1101*a-e* of FIG. 11, passage 1310 of FIG. 13, passages 1411 and 1421 of FIG. 14. Alternatively or additionally, one or more audio sensors, circuitry and/or any other hardware associated with the audio sensor(s) (e.g., electrodes, wires, etc.), etc. may be integrated into one or more portions of textile structure 200.

Figure 2B:
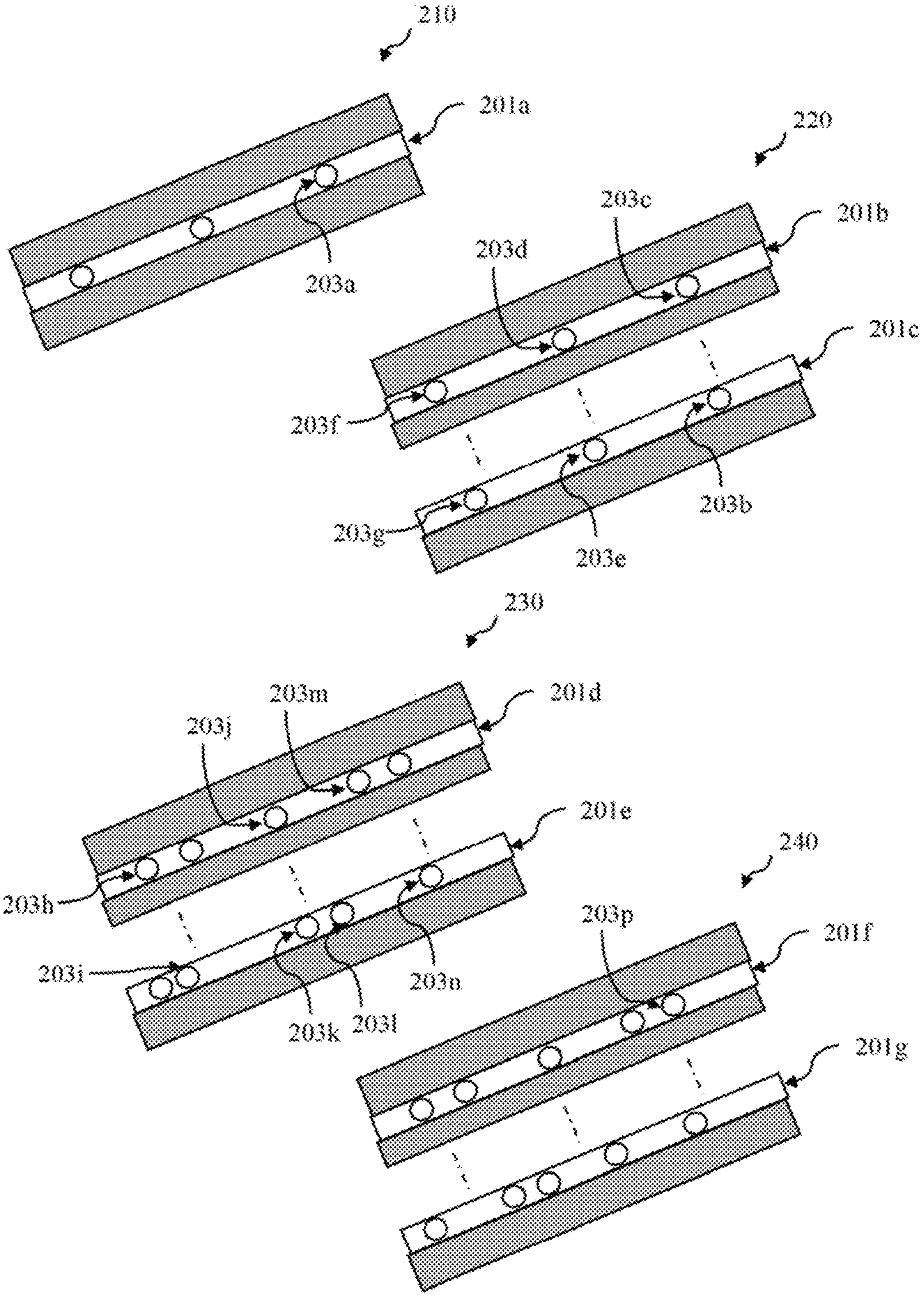

FIG. 2B illustrates examples 210, 220, 230, and 240 of a textile structure with embedded sensors in accordance with some embodiments of the disclosed subject matter. Each of textile structures 210, 220, 230, and 240 may represent a portion of a wearable device. For example, each of textile structures 210, 220, 230, and 240 can be included in a layer of a textile structures as shown in FIG. 2A. As another example, two or more textile structures 210, 220, 230, and 240 may be included in a layer of a textile structure of FIG. 2A. Alternatively or additionally, textile structures 210, 220, 230, and 240 may be used in multiple wearable devices.

Each of textile structures 210, 220, 230, and 240 can include one or more passages (e.g., passages 201*a*, 201*b*, 201*c*, 201*d*, 201*e*, 201*e*, 201*f*, and 201*g*). Each of the passages may include one or more audio sensors (e.g., audio sensors 203*a-p*), circuitry and/or any other hardware associated with the audio sensor(s), and/or any other suitable component in accordance with some embodiments of the disclosure. Each of audio sensors 203*a*-*p* may be and/or include an audio sensor 110 as described in connection with FIG. 1 above.

In some embodiments, one or more passages 201*a*-*g* may extend longitudinally along the textile structure. Alternatively, each of passages 201*a*-*g* may be arranged in any other suitable direction.

Multiple passages in a textile structure can be arranged in any suitable manner. For example, multiple passages positioned in a textile structure (e.g., passages 201*b*-*c*, passages 201*d*-*e*, passages 201*f*-*g*, etc.) may or may not be parallel to each other. As another example, the starting point and the termination point of multiple passages in a textile structure (e.g., passages 201*b*-*c*, passages 201*d*-*e*, passages 201*f*-*g*, etc.) may or may not be the same. As still another example, multiple passages in a textile structure may have the same or different dimensions (e.g., lengths, widths, heights (e.g., thicknesses), shapes, etc.). Each of passages 201*a*-*g* may have any suitable shape, such as curve, rectangle, oval, the like, or any combination thereof. The spatial structure of passages 201*a*-*g* can include, but is not limited to, cuboid, cylinder, ellipsoid, the like, or any combination thereof. The shapes and spatial structures of multiple passages can be the same or different. One or more portions of each of passages 201*a*-*g* may be hallow. In some embodiments, each of passages 201*a*-*g* can be and/or include a passage 1101*a*-*e* as described in conjunction with FIG. 11 below. Each of passages 201*a*-*g* can also be and/or include a passage 1411 and/or 1412 shown in FIG. 14.

While two passages are shown in examples 220, 230, and 240, this is merely illustrative. Each textile structure can include any suitable number of passages (e.g., zero, one, two, etc.).

As illustrated, each of audio sensors 203*a*-*p* may be positioned in a passage. One or more circuits associated with one or more of the audio sensors (e.g., circuitry as described in connection with FIGS. 12-16) may also be positioned in the passage. In some embodiments, the audio sensors 203 can lie on a longitudinal line in the passage 201. Yet in another embodiment, the audio sensors 203 can lie on different lines in the passage 201. In some embodiments, one or more rows of audio sensors 203 can be mounted in one passage 201. The audio sensors 203 can be mounted in the passage 201 of the textile structure with or without parts protruding from the textile structure. For example, the audio sensors 203 and/or their associated circuitry do not protrude from the textile structure in some embodiments.

In some embodiments, the number of passages 201 and the way the audio sensors 203 are arranged can be the same or different. In 210, the passage 201 can be manufactured in a textile structure and one or more audio sensors can be mounted in the passage 201. The outputs of audio sensors 203 can be combined to produce an audio signal. In examples 220, 230, and 240, multiple passages 201 can be manufactured in a textile structure and one or more audio sensors can be mounted in each passage 201. The distance between the adjacent passages 201 can be the same or different. In 220, the audio sensors can lie on the parallel latitudinal lines. The latitudinal line can be perpendicular to the longitudinal line. Then the audio sensors can be used to form one or more differential directional audio sensor subarrays. The one or more differential directional audio sensor subarrays' outputs can be combined to produce an audio signal. For example, audio sensor 203*b* and 203*c* can form a differential directional audio sensor subarray. The audio sensor 203*d* and the audio sensor 203*e* can form a differential directional audio sensor subarray. The audio sensor 203*f* and the audio sensor 203*g* can form a differential directional audio sensor subarray.

In 230, the audio sensors 203 can lie on the parallel latitudinal lines and other lines. The audio sensors 203 that lie on the parallel latitudinal lines can be used to form one or more differential directional audio sensor subarrays. The one or more differential directional audio sensor subarrays' outputs can be combined to produce an audio signal. For example, the audio sensor 203*h* and the audio sensor 203*i* can form a differential directional audio sensor subarray. Audio sensors 203*j* and 203*k* can form a differential directional audio sensor subarray. The audio sensors 203*m* and 203*n* can form a differential directional audio sensor subarray. In some embodiments, in 240, the one or more audio sensors 203 can be arranged randomly and lie on a plurality of latitudinal lines. The outputs of the audio sensors 203 can be combined to produce an audio signal.

FIG. 3 illustrates an example 300 of a processor in accordance with some embodiments of the disclosed subject matter. As shown, processor 300 can include an I/O module 310, a spatial filtering module 320, an echo cancellation module 330, a noise reduction module 340, and/or any other suitable component for processing audio signals in accordance with various embodiments of the disclosure. More or less components may be included in processor 300 without loss of generality. For example, two of the modules may be combined into a single module, or one of the modules may be divided into two or more modules. In one implementations, one or more of the modules may reside on different computing devices (e.g., different server computers). In some embodiments, processor 300 of FIG. 3 may be the same as the processor 120 of FIG. 1.

I/O module 310 can be used for different control applications. For example, the I/O module 310 can include circuits for receiving signals from an electronic device, such as an audio sensor, a pressure sensor, a photoelectric sensor, a current sensor, the like, or any combination thereof. In some embodiments, the I/O module 310 can transmit the received signals or any other signal (s) (e.g., a signal derived from one or more of the received signals or a signal relating to one or more of the received signals) to other modules in the system 300 (e.g., the spatial filtering module 320, the echo cancellation module 330, and the noise reduction module 340) through a communication link. In some other embodiments, the I/O module 310 can transmit signals produced by one or more components of processor 300 to any other device for further processing. In some embodiments, the I/O module 310 can include an analog-to-digital converter (not shown in FIG. 3) that can convert an analog signal into a digital signal.

The spatial filtering module 320 can include one or more beamformers 322, low-pass filters 324, and/or any other suitable component for performing spatial filtering on audio signals. The beamformer(s) 322 can combine audio signals received by different audio sensors of subarrays. For example, a beamformer 322 can respond differently with signals from different directions. Signals from particular directions can be allowed to pass the beamformer 322 while signals from other directions can be suppressed. Directions of signals distinguished by the beamformer(s) 322 can be determined, for example, based on geometric information of audio sensors of a microphone array and/or a microphone subarray that form the beamformer(s) 322, the number of the audio sensors, location information of a source signal, and/or any other information that may relate to directionality of the signals. In some embodiments, beamformer(s) 322 can include one or more beamformer 400 of FIG. 4 and/or one or more portions of beamformer 400. As will be discussed in conjunction with FIG. 4 below, beamformer(s) 322 can perform beamforming without referring to geometric information of the audio sensors (e.g., the positions of the audio sensors, a distance between the audio sensors, etc.) and the location of the source signal.

The low-pass filter(s) 324 can reduce the distortion relating to the deployment of the beamformer(s). In some embodiments, the low pass filter 324 can remove a distortion component of an audio signal produced by beamformer(s) 322. For example, the distortion component may be removed by equalizing the distortion (e.g., distortion caused by subarray geometry of the audio sensors, amount of the audio sensors, source locations of the signals, the like, or any combination thereof).

As shown in FIG. 3, processor 300 can also include an echo cancellation module 330 that can remove an echo and/or feedback component (also referred to herein as the "echo component") contained in an input audio signal (e.g., a signal produced by I/O module 310, spatial filtering module 320, or any other device). For example, echo cancellation module 330 can estimate an echo component contained in the input audio signal and can remove the echo component from the input audio signal (e.g., by subtracting the estimated echo component from the input audio signal). The echo component of the input audio signal may represent echo produced due to lack of proper acoustic isolation between an audio sensor (e.g., a microphone) and one or more loudspeakers in an acoustic environment. For example, an audio signal generated by a microphone can contain echo and feedback components from far-end speech and near-end audio (e.g., commands or audio signals from an infotainment subsystem), respectively. These echo and/or feedback components may be played back by one or more loudspeakers to produce acoustic echo.

In some embodiments, echo cancellation module 330 can include an acoustic echo canceller 332, a double talk detector 334, and/or any other suitable component for performing echo and/or feedback cancellation for audio signals.

In some embodiments, the acoustic echo canceller 332 can estimate the echo component of the input audio signal. For example, acoustic echo canceller 332 can construct a model representative of an acoustic path via which the echo component is produced. Acoustic echo canceller 332 can then estimate the echo component based on the model. In some embodiments, the acoustic path can be modeled using an adaptive algorithm, such as a normalized least mean square (NLMS) algorithm, an affine projection (AP) algorithm, a frequency-domain LMS (FLMS) algorithm, etc. In some embodiments, the acoustic path can be modeled by a filter, such as an adaptive filter with finite impulse response (FIR). The adaptive filter can be constructed as described in conjunction with FIGS. 5 and 6 below.

Double talk detector 334 can perform double talk detection and can cause echo cancellation to be performed based on such detection. Double-talk may occur when echo cancellation module 330 receives multiple signals representative of the speech of multiple talkers simultaneously or substantially simultaneously. Upon detecting an occurrence of double talk, double talk detector 334 can halt or slow down the adaptive filter constructed by acoustic echo canceller 332.

In some embodiments, double talk detector 334 can detect occurrences of double talk based on information about correlation between one or more loudspeaker signals and output signals produced by one or more audio sensors. For example, an occurrence of double talk can be detected based on energy ratio testing, cross-correlation or coherence like statistics, the like, or any combination thereof. Double talk detector 334 can also provide information about the correlation between the loudspeaker signal and the microphone signal to acoustic echo canceller 332. In some embodiments, the adaptive filter constructed by acoustic echo canceller 332 can be halted or slowed down based on the information. Various functions performed by echo cancellation module 330 will be discussed in more detail in conjunction with FIGS. 5 and 6.

Noise reduction module 340 can perform noise reduction on an input audio signal, such as an audio signal produced by one or more audio sensors, I/O module 310, spatial filtering module 320, echo cancellation module 330, and/or any other device. As shown in FIG. 3, noise reduction module 340 can include a channel selection unit 342, a multichannel noise reduction (MNR) unit 344, a residual noise and echo suppression unit 346, and/or any other suitable component for performing noise reduction.

Channel selection unit 342 can select one or more audio channels for further processing. The audio channels may correspond to outputs of multiple audio sensors, such as one or more microphone arrays, microphone subarrays, etc. In some embodiments, one or more audio channels can be selected based on quality of audio signals provided via the audio channels. For example, one or more audio channels can be selected based on the signal to noise ratios (SNRs) of the audio signals provided by the audio channels. More particularly, for example, channel selection unit 342 may select one or more audio channels that are associated with particular quality (e.g., particular SNRs), such as the highest SNR, the top three SNRs, SNRs higher than a threshold, etc.

Upon selecting the audio channel(s), channel selection unit 342 can provide the multichannel noise reduction (MCNR) unit 344 with information about the selection, audio signals provided via the selected audio channel(s), and/or any other information for further processing. The MCNR unit 344 can then perform noise reduction on the audio signal(s) provided by the selected audio channel(s).

The MCNR unit 344 can receive one or more input audio signals from channel selection unit 342, I/O module 310, spatial filtering module 320, echo cancellation module 330, one or more audio sensors, and/or any other device. An input audio signal received at the MCNR unit 344 may include a speech component, a noise component, and/or any other component. The speech signal may correspond to a desired speech signal (e.g., a user's voice, any other acoustic input, and/or any other desired signal). The noise component may correspond to ambient noise, circuit noise, and/or any other type of noise. The MCNR unit 344 can process the input audio signal to produce a speech signal (e.g., by estimating statistics about the speech component and/or the noise component). For example, the MCNR unit 344 can construct one or more noise reduction filters and can apply the noise reduction filters to the input audio signal to produce a speech signal and/or a denoised signal. Similarly, one or more noise reduction filters can also be constructed to process multiple input audio signals corresponding to multiple audio channels. One or more of these noise reduction filters can be constructed for single-channel noise reduction and/or multichannel noise reduction. The noise reduction filter(s) may be constructed based on one or more filtering techniques, such as the classic Wiener filtering, the comb filtering technique (a linear filter is adapted to pass only the harmonic components of voiced speech as derived from the pitch period), linear all-pole and pole-zero modeling of speech (e.g., by estimating the coefficients of the speech component from the noisy speech), hidden Markov modeling, etc. In some embodiments, one or more noise reduction filters may be constructed by performing one or more operations described in conjunction with FIG. 10 below.

In some embodiments, the MCNR unit 344 can estimate and track the noise statistics during silent periods. The MCNR unit 344 can use the estimated information to suppress the noise component when the speech signal is present. In some embodiments, the MCNR unit 344 can achieve noise reduction with less or even no speech distortion. The MCNR unit 344 can process the output signals of multiple audio sensors. The output signals of multiple audio sensors can be decomposed into a component from an unknown source, a noise component, and/or any other component. In some embodiments, the MCNR unit 344 can obtain an estimate of the component from the unknown source. MCNR unit 344 can then produce an error signal based on the component from the unknown source and the corresponding estimation process. The MCNR unit 344 can then generate a denoised signal according to the error signal.

In some embodiments, noise reduction can be performed for an audio channel based on statistics about audio signals provided via one or more other audio channels. Alternatively or additionally, noise reduction can be performed on an individual audio channel using a single-channel noise reduction approach.

The speech signal produced by the MCNR unit 344 can be supplied to the residual noise and echo suppression unit 346 for further processing. For example, the residual noise and echo suppression unit 346 can suppress residual noise and/or echo included in the speech signal (e.g., any noise and/or echo component that has not been removed by echo MCNR 344 and/or echo cancellation module 330. Various functions performed by noise reduction module 340 will be discussed in more detail in conjunction with FIG. 10.

The description herein is intended to be illustrative, and not to limit the scope of the claims. Many alternatives, modifications, and variations will be apparent to those skilled in the art. The features, structures, methods, and other characteristics of the exemplary embodiments described herein can be combined in various ways to obtain additional and/or alternative exemplary embodiments. For example, there can be a line echo canceller (not shown in FIG. 3) in the echo cancellation module 330 to cancel line echo. As another example, the acoustic echo canceller 334 can have the functionality to cancel the line echo.

Figure 4:
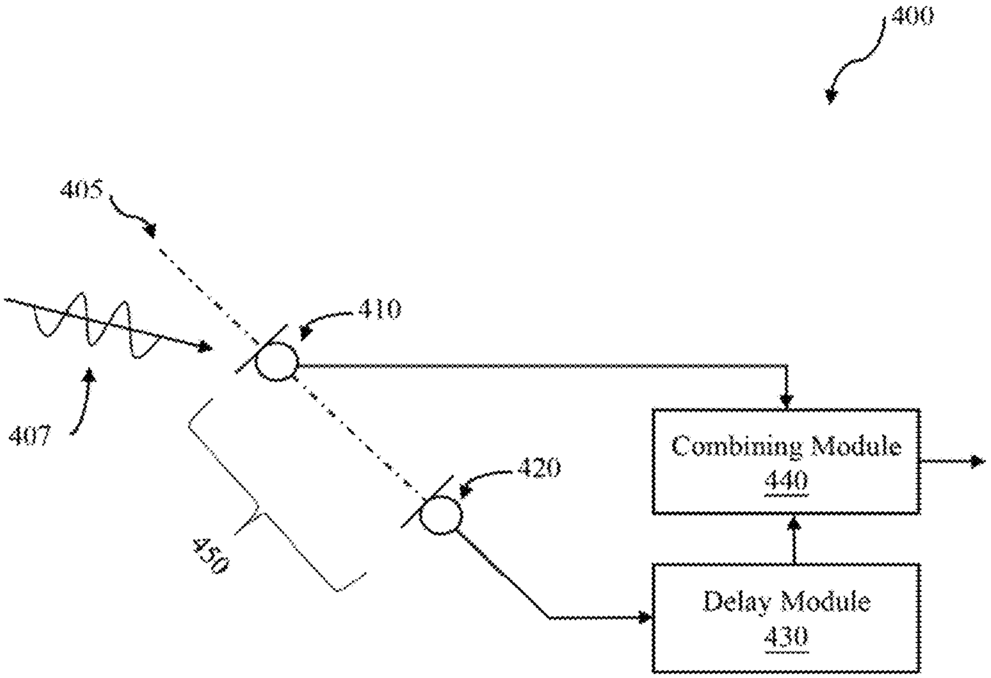
FIG. 4 is a schematic diagram illustrating an example of a beamformer in accordance with some embodiments of the disclosed subject matter.

FIG. 4 is a schematic diagram illustrating an example 400 of a beamformer in accordance with some embodiments of the disclosed subject matter. In some embodiments, the beamformer 400 may be the same as the beamformer(s) 322 as shown in FIG. 3.

In some embodiments, a microphone subarray 450 may include audio sensors 410 and 420. Each of audio sensors 410 and 420 can be an omnidirectional microphone or have any other suitable directional characteristics. Audio sensors 410 and 420 can be positioned to form a differential beamformer (e.g., a fixed differential beamformer, an adaptive differential beamformer, a first-order differential beamformer, a second-order differential beamformer, etc.). In some embodiments, audio sensors 410 and 420 can be arranged in a certain distance (e.g., a distance that is small compared to the wavelength of an impinging acoustic wave). Audio sensors 410 and 420 can form a microphone subarray as described in connection with FIGS. 2A-B above. Each of audio sensors 410 and 420 may be and/or include an audio sensor 110 of FIG. 1.

Axis 405 is an axis of microphone subarray 450. For example, axis 405 can represent a line connecting audio sensors 410 and 420. For example, axis 405 can connect the geometric centers of audio sensors 410 and 420 and/or any other portions of audio sensors 410 and 420.

Audio sensor 410 and audio sensor 420 can receive an acoustic wave 407. In some embodiments, acoustic wave 407 can be an impinging plane wave, a non-plane wave (e.g., a spherical wave, a cylindrical wave, etc.), etc. Each of audio sensors 410 and 420 can generate an audio signal representative of acoustic wave 407. For example, audio sensors 410 and 420 may generate a first audio signal and a second audio signal, respectively.

Delay module 430 can generate a delayed audio signal based on the first audio signal and/or the second audio signal. For example, delay module 430 can generate the delayed audio signal by applying a time delay to the second audio signal. The time delay may be determined using a linear algorithm, a non-linear algorithm, and/or any other suitable algorithm that can be used to generate a delayed audio signal. As will be discussed in more detail below, the time delay may be adjusted based on the propagation time for an acoustic wave to axially travel between audio sensors 410 and 420 to achieve various directivity responses.

Combining module 440 can combine the first audio signal (e.g., the audio signal generated by audio sensor 410) and the delayed audio signal generated by delay module 430. For example, combining module 440 can combine the first audio signal and the delayed audio signal in an alternating sign fashion. In some embodiments, combining module 440 can combine the first audio signal and the delayed audio signal using a near field model, a far field model, and/or any other model that can be used to combine multiple audio signals. For example, two sensors may form a near-filed beamformer. In some embodiments, the algorithm used by the combining module 440 can be a linear algorithm, a non-linear algorithm, a real time algorithm, a non-real time algorithm, a time domain algorithm or frequency domain algorithm, the like, or any combination thereof. In some embodiments, the algorithm of the combining module 440 used can be based on one or more beamforming or spatial filtering techniques, such as a two steps time delay estimates (TDOA) based algorithm, one step time delay estimate, a steered beam based algorithm, independent component analysis based algorithm, a delay and sum (DAS) algorithm, a minimum variance distortionless response (MVDR) algorithm, a generalized sidelobe canceller (GSC) algorithm, a minimum mean square error (MMSE), the like, or any combination thereof.

In some embodiments, audio sensors 410 and 420 can form a fixed first-order differential beamformer. More particularly, for example, the first-order differential beamformer's sensitivity is proportional up to and including the first spatial derivative of the acoustic pressure filed. For a plane wave with amplitude $S_0$ and angular frequency ω incident on microphone subarray 450, the output of the combining module 440 can be represented using the following equation:

$$X(\omega,\theta)=S_0\cdot[1-e^{-j\omega(\tau+d\cdot\cos\theta/c)}]. \quad (1)$$

In equation (1), d denotes the microphone spacing (e.g., a distance between audio sensors 410 and 420); c denotes the speed of sound; θ denotes the incidence angle of the acoustic wave 407 with respect to axis 405; and τ denotes a time delay applied to one audio sensor in the microphone subarray.

In some embodiments, the audio sensor spacing d can be small (e.g., a value that satisfies $\omega \cdot d/c \ll \pi$ and $\omega \cdot \tau \ll \pi$). The output of the combining module 440 can then be represented as:

$$X(\omega,\theta) \approx S_0 \cdot \omega(\tau + d/c \cdot \cos\theta) \quad (2)$$

As illustrated in equation (2), the combining module 440 does not have to refer to geometric information about audio sensors 410 and 420 to generate the output signal. The term in the parentheses in equation (2) may contain the microphone subarray's directional response.

The microphone subarray may have a first-order high-pass frequency dependency in some embodiments. As such, a desired signal S(jw) arriving from straight on axis 405 (e.g., $\theta=0$) may be distorted by the factor w. This distortion may be reduced and/or removed by a low-pass filter (e.g., by equalizing the output signal produced by combining module 440). In some embodiments, the low-pass filter can be a matched low-pass filter. As a more particular example, the low-pass filter can be a first-order recursive low-pass filter. In some embodiments, the low-pass filter can be and/or include a low-pass filter 324 of FIG. 3.

In some embodiments, combining module 440 can adjust the time delay $\tau$ based on the propagation time for an acoustic wave to axially travel between two audio sensors of a subarray (e.g., the value of d/c). More particularly, for example, the value of $\tau$ may be proportional to the value of d/c (e.g., the value of $\tau$ may be "0," d/c, d/3c,d/$\sqrt{3}$c, etc.). In some embodiments, the time delay $\tau$ can be adjusted in a range (e.g., a range between 0 and the value of d/c) to achieve various directivity responses. For example, the time delay may be adjusted so that the minimum of the microphone subarray's response varies between 90° and 180°. In some embodiments, the time delay $\tau$ applied to audio sensor 420 can be determined using the following equation:

$$\tau = \frac{d}{c}\cos\theta \quad (2.1)$$

Alternatively or additionally, the delay time $\tau$ can be calculated using the following equation:

$$\tau = \frac{d}{c}\sin\theta \quad (2.2)$$

Figure 5:
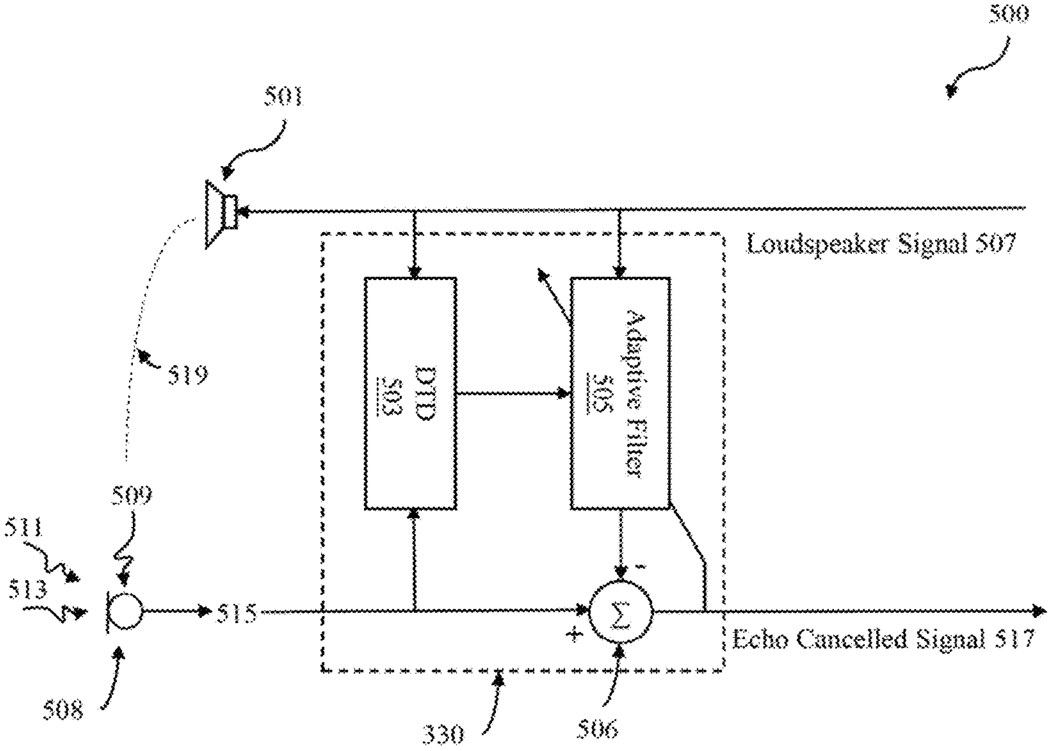
FIG. 5 is a diagram illustrating an example of an acoustic echo canceller in accordance with one embodiment of the disclosed subject matter.

FIG. 5 is a diagram illustrating an example 500 of an acoustic echo canceller (AEC) in accordance with one embodiment of the disclosed subject matter.

As shown, AEC 500 can include a loudspeaker 501, a double-talk detector (DTD) 503, an adaptive filter 505, a combiner 506, and/or any other suitable component for performing acoustic echo cancellation. In some embodiments, one or more components of AEC 500 may be included in the echo cancellation module 330 of FIG. 3. For example, as illustrated in FIG. 5, the echo cancellation module 330 may include the DTD 503, the adaptive filter 505, and the combiner 506. More details of audio sensor 508 can be found in FIGS. 2A-B as audio sensors 203.

The loudspeaker 501 can be and/or include any device that can convert an audio signal into a corresponding sound. The loudspeaker 501 may be a stand-alone device or be integrated with one or more other devices. For example, the loudspeaker 501 may be a built-in loudspeaker of an automobile audio system, a loudspeaker integrated with a mobile phone, etc.

The loudspeaker 501 can output a loudspeaker signal 507. The loudspeaker signal 507 may pass through an acoustic path (e.g., acoustic path 519) and may produce an echo signal 509. In some embodiments, the loudspeaker signal 507 and the echo signal 509 may be represented as x(n) and $y_e(n)$, respectively, where n denotes a time index. The echo signal 509 can be captured by the audio sensor 508 together with a local speech signal 511, a local noise signal 513, and/or any other signal that can be captured by audio sensor 508. The local speech signal 511 and the local noise signal 513 may be denoted as v(n) and u(n), respectively. The local speech signal 511 may represent a user's voice, any other acoustic input, and/or any other desired input signal that can be captured by audio sensor 508. The local noise signal 513 may represent ambient noise and/or any other type of noise. The local speech v(n) 511 can be intermittent by nature and the local noise u(n) 513 can be relatively stationary.

The audio sensor 508 may output an output signal 515. The output signal 515 can be represented as a combination of a component corresponding to the echo signal 509 (e.g., the "echo component"), a component corresponding to the local speech 511 (e.g., the speech component), a component corresponding to the local noise 513 (e.g., the "noise component"), and/or any other component.

The echo cancellation module 330 can model the acoustic path 519 using the adaptive filter 505 to estimate the echo signal 509. The adaptive filter 505 may be and/or include a filter with a finite impulse response (FIR) to estimate the echo signal 509. The echo cancellation module 330 can estimate the filter using an adaptive algorithm. In some embodiments, the adaptive filter 505 can be a system with a linear filter that has a transfer function controlled by one or more variable parameters and one or more means to adjust the one or more parameters according to an adaptive algorithm.

The adaptive filter 505 may receive the loudspeaker signal 507 and the output signal 515. The adaptive filter 505 may then process the received signals to generate an estimated echo signal (e.g., signal $\hat{y}(n)$) representative of an estimation of the echo signal 509. The estimated echo signal can be regarded as a replica of the echo signal 509. The combiner 506 can generate an echo cancelled signal 517 by combining the estimated echo signal and the output signal 515. For example, the echo cancelled signal 517 can be generated by subtracting the estimated echo signal from the output signal 515 to achieve echo and/or feedback cancellation. In the adaptive algorithm, both the local speech signal v(n) 511 and the local noise signal u(n) 513 can act as uncorrelated interference. In some embodiments, the local speech signal 511 may be intermittent while the local noise signal 513 may be relatively stationary.

In some embodiments, the algorithm used by the adaptive filter 505 can be linear or nonlinear. The algorithm used by the adaptive filter 505 can include, but is not limited to, a normalized least mean square (NLMS), affine projection (AP) algorithm, recursive least squares (RLS) algorithm, frequency-domain least mean square (FLMS) algorithm, the like, or any combination thereof.

In some embodiments, a developed FLMS algorithm can be used to model the acoustic path 519 and/or to generate the estimated echo signal. Using the FLMS algorithm, an acoustic impulse response representative of the acoustic path 519 and the adaptive filter 505 may be constructed. The acoustic impulse response and the adaptive filter 505 may have a finite length of L in some embodiments. The developed FLMS algorithm can transform one or more signals from the time or space domain to a representation in the frequency domain and vice versa. For example, the fast Fourier transform can be used to transform an input signal into a representation in the frequency domain (e.g., a frequency-domain representation of the input signal). The overlap-save technique can process the representations. In some embodiments, an overlap-save technique can be used to process the frequency-domain representation of the input (e.g., by evaluating the discrete convolution between a signal and a finite impulse response filter). The transforming method from the time or space domain to a representation in the frequency domain and vice versa can include, but is not limited to the fast Fourier transform, the wavelet transform, the Laplace transform, the Z-transform, the like, or any combination thereof. The FFT can include, but is not limit to, Prime-factor FFT algorithm, Bruun's FFT algorithm, Rader's FFT algorithm, Bluestein's FFT algorithm, the like, or any combination thereof.

The true acoustic impulse response produced via the acoustic path 519 can be characterized by a vector, such as the following vector:

$$h \triangleq [h_0 h_1 \ldots h_{L-1}]^T. \quad (3)$$

The adaptive filter 505 can be characterized by a vector, such as the following vector:

$$\hat{h}(n) \triangleq [\hat{h}_0(n)\hat{h}_1(n) \ldots \hat{h}_{L-1}(n)]^T. \quad (4)$$

In equations (3) and (4), $(\cdot)^T$ denotes the transposition of a vector or a matrix and n is the discrete time index. h may represent the acoustic path 519. $\hat{h}(n)$ may represent an acoustic path modeled by the adaptive filter 505. Each of vectors h and $\hat{h}(n)$ may be a real-valued vector. As illustrated above, the true acoustic impulse and the adaptive filter may have a finite length of L in some embodiments.

The output signal 515 of the audio sensor 508 can be modeled based on the true acoustic impulse response and can include one or more components corresponding to the echo signal 509, the speech signal 511, the local noise signal 513, etc. For example, the output signal 515 may be modeled as follows:

$$y(n)=x^T(n)\cdot h+w(n), \quad (5)$$

where $$x(n) \triangleq [x(n)x(n-1) \ldots x(n-L+1)], \quad (6)$$

$$w(n) \triangleq v(n)+u(n), \quad (7)$$

In equations (5)-(7), x(n) corresponds to the loudspeaker signal 507 (e.g., L samples); v(n) corresponds to the local speech signal 511; and u(n) corresponds to the local noise signal 513.

In some embodiments, the output signal y(n) 515 and the loudspeaker signal x(n) 507 can be organized in frames. Each of the frames can include a certain number of samples (e.g., L samples). A frame of the output signal y(n) 515 can be written as follows:

$$y(m) \triangleq [y(m\cdot L)y(m\cdot L+1) \ldots y(m\cdot L+L-1)]^T. \quad (8)$$

A frame of the loudspeaker signal x(n) 507 can be written as follows:

$$x(m) \triangleq [x(m\cdot L)x(m\cdot L+1) \ldots x(m\cdot L+L-1)]^T, \quad (9)$$

In equations (8) and (9), m represents an index of the frames (m=0, 1, 2, . . . ).

The loudspeaker signal and/or the output signal may be transformed to the frequency domain (e.g., by performing one or more fast Fourier transforms (FFTs)). The transformation may be performed on one or more frames of the loudspeaker signal and/or the output signal. For example, a frequency-domain representation of a current frame (e.g., the mth frame) of the loudspeaker signal may be generated by performing 2L-point FFTs as follows:

$$x_f(m) \triangleq F_{2L\times 2L} \cdot \begin{bmatrix} x(m) \\ x(m-1) \end{bmatrix}, \quad (10)$$

where $F_{2L\times 2L}$ can be the Fourier matrix of size (2L×2L).

A frequency-domain representation of the adaptive filter applied to a previous frame (e.g., the (m−1) th frame) may be determined as follows:

$$\hat{h}_f(m-1) \triangleq F_{2L\times 2L} \cdot \begin{bmatrix} \hat{h}(m-1) \\ 0_{L\times 1} \end{bmatrix}, \quad (11)$$

where $F_{2L\times 2L}$ can be the Fourier matrix of size (2L×2L).

The Schur (element-by-element) product of $x_f(m)$ and $\hat{h}_f(m-1)$ can be calculated. A time-domain representation of the Schur product may be generated (e.g., by transforming the Schur product to the time domain using the inverse FFT or any other suitable transform a frequency-domain signal to the time domain). The echo cancellation module 330 can then generate an estimate of the current frame of the echo signal (e.g., y(m)) based on the time-domain representation of the Schur product. For example, the estimated frame (e.g., a current frame of an estimated echo signal echo $\hat{y}(m)$) may be generated based on the last L elements of the time-domain representation of the Schur product as follows:

$$\hat{y}(m)=W_{L\times 2L}^{01}\cdot F_{2L\times 2L}^{-1}\cdot[x_f(m)\odot\hat{h}_f(m-1)], \quad (12)$$

where $$W_{L\times 2L}^{01} \triangleq [0_{L\times L}1_{L\times L}]. \quad (13)$$

and $\odot$ can denote the Schur product.

The echo cancellation module 330 can update one or more coefficients of the adaptive filter 505 based on a priori error signal representative of similarities between the echo signal and the estimated echo signal. For example, for the current frame of the echo signal (e.g., y(m)), a priori error signal e(m) may be determined based on the difference between the current frame of the echo signal (e.g., y(m)) and the current frame of the estimated signal $\hat{y}(m)$. In some embodiments, the priori error signal e(m) can be determined based on the following equation:

$$e(m)=y(m)-\hat{y}(m)=y(m)-W_{L\times 2L}^{01}\cdot F_{2L\times 2L}^{-1}\cdot[x_f(m)\odot\hat{h}_f(m-1)]. \quad (14)$$

Denote $X_f(m) \triangleq \mathrm{diag}\{x_f(m)\}$ as a 2L×2L diagonal matrix whose diagonal elements are the elements of $x_f(m)$. Then equation (14) can be written as:

$$e(m)=y(m)-W_{L\times 2L}^{01}\cdot F_{2L\times 2L}^{-1}\cdot X_f(m)\cdot\hat{h}_f(m-1), \quad (15)$$

Based on the priori error signal, a cost function J(m) can be defined as:

$$J(m) \triangleq (1-\lambda)\cdot\Sigma_{i=0}^{m}\lambda^{m-1}\cdot e^T(i)\cdot e(i) \quad (16)$$

where λ is an exponential forgetting factor. The value of λ can be set as any suitable value. For example, the value of λ may fall within a range (e.g., 0<λ<1). A normal equation may be produced based on the cost function (e.g., by setting the gradient of the cost function J(m) to zero). The echo cancellation module 330 can derive an update rule for the FLMS algorithm based on the normal function. For example, the following updated rule may be derived by enforcing the normal equation at time frames m and m−1:

$$e_f(m) = F_{2L\times 2L}\cdot\begin{bmatrix}0_{L\times 1}\\ e(m)\end{bmatrix} = F_{2L\times 2L}\cdot W^{01}_{2L\times 2L}\cdot e(m), \tag{17}$$

$$\hat{h}_f(m) = \hat{h}_f(m-1) + 2\mu\cdot(1-\lambda)\cdot G^{10}_{2L\times 2L}\cdot[S_f(m)+\delta I_{2L\times 2L}]^{-1}\cdot X^*_f(m)\cdot e_f(m), \tag{18}$$

where μ can be a step size, δ can be a regularization factor and $$G^{10}_{2L\times 2L} \triangleq F_{2L\times 2L}\cdot\begin{bmatrix}1_{L\times L} & 0_{L\times L}\\ 0_{L\times L} & 0_{L\times L}\end{bmatrix}\cdot F^{-1}_{2L\times 2L}. \tag{18.1}$$

$I_{2L\times 2L}$ can be the identity matrix of size 2L×2L and $S_f(m)$ can denote the diagonal matrix whose diagonal elements can be the elements of the estimated power spectrum of the loudspeaker 501's signal x(n) 507. The echo cancellation module 330 can recursively update matrix $S_f(m)$ based on the following equation:

$$S_f(m)=\lambda\cdot S_f(m)+(1-\lambda)\cdot X^*_f(m)\cdot X_f(m), \tag{19}$$

where $(\cdot)^*$ can be a complex conjugate operator.

By approximating $G_{2L\times 2L}{}^{10}$ as $I_{2L\times 2L}/2$, the echo cancellation module 330 can deduce an updated version of the FLMS algorithm. The echo cancellation module 330 can update the adaptive filter 505 recursively. For example, the adaptive filter 505 may be updated once every L samples. When L can be large as in the echo cancellation module 330, a long delay can deteriorate the tracking ability of the adaptive algorithm. Therefore, it can be worthwhile for the echo cancellation module 330 to sacrifice computational complexity for better tracking performance by using a higher or lower percentage of overlap.

Based on equation (16), the FLMS algorithm can be adapted based on a recursive least-squares (RLS) criterion. The echo cancellation module 330 can control the convergence rate, tracking, misalignment, stability of the FLMS algorithm, the like, or any combination thereof by adjusting the forgetting factor λ. The forgetting factor λ can be time varying independently in one or more frequency bins. The step size μ and the regularization δ in equation (18) can be ignored for adjusting the forgetting factor λ in some embodiments. The forgetting factor λ can be adjusted by performing one or more operations described in connection with equations (20)-(31) below. In some embodiments, an update rule for the FLMS algorithm (e.g., the unconstrained FLMS algorithm) can be determined as follows:

$$\hat{h}_f(m)=\hat{h}_f(m-1)+\Lambda_v(m)\cdot S_f^{-1}(m)\cdot X^*_f(m)\cdot e_f(m), \tag{20}$$

where $$v_l(m)\triangleq 1-\lambda_l(m), l=1,2,\ldots,2L, \tag{20.1}$$

$$\Lambda_v(m)\triangleq \mathrm{diag}[u_1(m)u_2(m)\ldots u_{2L}(m)]. \tag{20.2}$$

The frequency-domain a priori error vector $e_f(m)$ can then be rewritten by substituting (15) into (17) as follows:

$$e_f(m) = y_f(m) - G^{01}_{2L\times 2L}\cdot X_f(m)\cdot\hat{h}_f(m-1), \tag{21}$$

where $$y_f(m) \triangleq F_{2L\times 2L}\cdot W^{01}_{2L\times 2L}\cdot y(m), \tag{21.1}$$

$$G^{10}_{2L\times 2L} \triangleq F_{2L\times 2L}\cdot\begin{bmatrix}0_{L\times L} & 0_{L\times L}\\ 0_{L\times L} & 1_{L\times L}\end{bmatrix}\cdot F^{-1}_{2L\times 2L}. \tag{21.2}$$

The echo cancellation module 330 can determine the frequency-domain a priori error vector $\varepsilon_f(m)$ as follows:

$$\varepsilon_f(m)=y_f(m)-G_{2L\times 2L}{}^{01}\cdot X_f(m)\cdot\hat{h}_f(m). \tag{22}$$

The echo cancellation module 330 can substitute the equation (20) into equation (22) and using (21) to yield an equation as follows:

$$\varepsilon_f(m)=[I_{2L\times 2L}-\tfrac{1}{2}\Lambda_v(m)\cdot\Psi_f(m)]\cdot e_f(m), \tag{23}$$

where the approximation $G_{2L\times 2L}{}^{01}\approx I_{2L\times 2L}/2$ can be used and $$\Psi_f(m)\triangleq \mathrm{diag}[\psi_1(m)\psi_2(m)\ldots\psi_{2L}(m)]=X_f(m)\cdot S_f^{-1}(m)\cdot X^*_f(m). \tag{24}$$

The expectation function $E[\psi_l(m)]$ can be determined as follows:

$$E[\psi_l(m)]=E[X_{f,l}(m)\cdot S_{f,l}{}^{-1}(m)\cdot X^*_{f,l}(m)]=1, l=1,2,\ldots,2L. \tag{25}$$

In some embodiments, forgetting factor λ and/or matrix $\Lambda_v(m)$ can be adjusted by the echo cancellation module 330 so that the following equation $$E[\varepsilon_{f,l}{}^2(m)]=E[W_{f,l}{}^2(m)], l=1,2,\ldots,2L, \tag{26}$$

can hold. As such, the echo cancellation module 330 can obtain a solution for the adaptive filter $\hat{h}_f(m)$ by satisfying:

$$E\{[\hat{h}-\hat{h}(m)]^T\cdot X^*_f(m)\cdot X_f(m)\cdot[\hat{h}-\hat{h}(m)]\}=0. \tag{27}$$

The echo cancellation module 330 can derive the following equation by substituting equation (23) into equation (26):

$$\frac{1}{2}v_l(m)\cdot E[\psi_l(m)] = 1 - \frac{\sigma_{w_{f,l}}}{\sigma_{e_{f,l}}}, \tag{28}$$

where $\sigma_a{}^2$, can denote the second moment of the random variable a, i.e., $\sigma_a{}^2\triangleq E\{a^2\}$. In some embodiments, equation (28) may be derived based on the assumption that the a priori error signal is uncorrelated with the input signal. Based on equation (25), the echo cancellation module 330 can derive the following equation from equation (28):

$$v_l(m) = 2\left(1 - \frac{\sigma_{w_{f,l}}}{\sigma_{e_{f,l}}}\right), l = 1, 2, \cdots, 2L. \tag{29}$$

In some embodiments, the adaptive filter can converge to a certain degree and echo cancellation module 330 can construct a variable forgetting factor control scheme for the FLMS algorithm based on the following approximation:

$$\hat{\sigma}_{w_{f,l}}{}^2\approx\hat{\sigma}_{y_{f,l}}{}^2-\hat{\sigma}_{\hat{y}_{f,l}}{}^2, \tag{30}$$

The variable forgetting factor control scheme may be constructed based on the following equation:

$$\lambda_l(m) = 1 - v_l(m) = 1 - 2\left(1 - \frac{\sqrt{\left|\hat{\sigma}^2_{y_{f,l}} - \hat{\sigma}^2_{\hat{y}_{f,l}}\right|}}{\hat{\sigma}_{e_{f,l}}}\right), \tag{31}$$

where $\hat{\sigma}_{e_{f,l}}{}^2$, $\hat{\sigma}_{y_{f,l}}{}^2 \hat{\sigma}_{y_{f,l}}{}^2$ can be recursively estimated by the echo cancellation module 330 from their corresponding signals, respectively.

Based on the adaptive algorithms described above, the adaptive filter 505 output ŷ(n) can be estimated and subtracted from the audio sensor 508's output signal y(n) 515 to achieve acoustic echo and feedback cancellation.

In some embodiments, the DTD 503 can detect one or more occurrences of double-talk. For example, double-talk may be determined to occur when the loudspeaker signal 507 and the output signal 515 are present at the adaptive filter 505 at the same time (e.g., $x(n)\neq 0$ and $v(n)\neq 0$). The presence of the loudspeaker signal 507 can affect the performance of the adaptive filter 505 (e.g., by causing the adaptive algorithm to diverge). For example, audible echoes can pass through the echo cancellation module 330 and can appear in the AEC system 500's output 517. In some embodiments, upon detecting an occurrence of double-talk, the DTD 503 can generate a control signal indicative the presence of double-talk at the adaptive filter 505. The control signal may be transmitted to the adaptive filter 505 and/or any other component of the AEC 330 to halt or slow down the adaption of the adaptive algorithm (e.g., by halting the update of the adaptive filter 505's coefficients).

The DTD 503 can detect double-talk using the Geigel algorithm, the cross-correlation method, the coherence method, the two-path method, the like, or any combination thereof. The DTD 503 can detect an occurrence of double-talk based on information related to cross-correlation between the loudspeaker signal 507 and the output signal 515. In some embodiments, a high cross-correlation between the loudspeaker and the microphone signal may indicate absence of double-talk. A low cross-correlation between the loudspeaker signal 507 and the output signal 515 may indicate an occurrence of double-talk. In some embodiments, cross-correlation between the loudspeaker signal and the microphone signal may be represented using one or more detection statistics. The cross-correlation may be regarded as being a high-correlation when one or more detection statistics representative of the correlation are greater than or equal to a threshold. Similarly, the cross-correlation may be regarded as being a high-correlation when one or more detection statistics representative of the correlation is not greater than a predetermined threshold. The DTD 503 can determine the relation between the loudspeaker signal and the output signal by determining one or more detection statistics based on the adaptive filter 505's coefficient (e.g., ĥ), the speaker signal 501, the microphone signal 515, the error signal e, and/or any other information that can be used to determine coherence and/or cross-correlation between the loudspeaker signal 507 and the output signal 515. In some embodiments, the DTD 503 can detect the occurrence of double-talk by comparing the detection statistic to a predetermined threshold.

Upon detecting an occurrence of double-talk, the DTD 503 can generate a control signal to cause the adaptive filter 505 to be disabled or halted for a period of time. In response to determining that double-talk has not occurred and/or that double-talk has not occurred for a given time interval, the DTD 503 can generate a control signal to cause the adaptive filter 505 to be enabled.

In some embodiments, the DTD 503 can perform double-talk detection based on cross-correlation or coherence-like statistics. The decision statistics can be further normalized (e.g., by making it be upper limited by 1). In some embodiments, variations of the acoustic path may or may not be considered when a threshold to be used in double-talk detection is determined.

In some embodiments, one or more detection statistics can be derived in the frequency domain. In some embodiments, one or more detection statistics representative of correlation between the loudspeaker signal 507 and the output signal 515 may be determined (e.g., by the DTD 503) in the frequency domain.

For example, the DTD 503 may determine one or more detection statistics and/or perform double-talk detection based on a pseudo-coherence-based DTD (PC-DTD) technique. The PC-DTD may be based on a pseudo-coherence (PC) vector $c_{xy}{}^{PC}$ that can be defined as follows:

$$c_{xy}^{PC} \triangleq [2L^2 \cdot \sigma_y^2 \cdot \Phi_{f,xx}]^{-1/2} \cdot \Phi_{xy}, \tag{32}$$

where $$\Phi_{f,xx} \triangleq E\{X_f^*(m) \cdot G_{2L\times 2L}^{10} \cdot X_f(m)\}, \tag{32.1}$$

$$G_{2L\times 2L}^{01} \triangleq F_{2L\times 2L} \cdot \begin{bmatrix} 0_{L\times L} & 0_{L\times L} \\ 0_{L\times L} & 1_{L\times L} \end{bmatrix} \cdot F_{2L\times 2L}^{-1}, \tag{32.2}$$

$$\Phi_{xy} \triangleq E\{X_f^*(m) \cdot y_{f,2L}(m)\}, \tag{32.3}$$

$$y_{f,2L}(m) \triangleq F_{2L\times 2L} \cdot \begin{bmatrix} 0_{L\times 1} \\ y(m) \end{bmatrix}. \tag{32.4}$$

The echo cancellation module 330 can use the approximation $G_{2L\times 2L}{}^{01} \approx I_{2L\times 2L}/2$ to calculate $\Phi_{f,xx}$. The calculation can be simplified with a recursive estimation scheme similar to (19) by adjusting a forgetting factor $\lambda_b$ (also referred to herein as the "background forgetting factor"). The background forgetting factor $\lambda_b$ may or may not be the same as the forgetting factor $\lambda_a$ described above (also referred to herein as the "foreground forgetting factor"). The DTD 503 may respond to the onset of near-end speech and may then alert the adaptive filter before it may start diverging. The estimated quantities may be determined based on the following equations:

$$\Phi_{f,xx}(m)=\lambda_b \cdot \Phi_{f,xx}(m-1)+(1-\lambda_b)\cdot X^*_f(m)\cdot X_f(m)/2, \tag{33}$$

$$\Phi_{xy}(m)=\lambda_b \cdot \Phi_{xy}(m-1)+(1-\lambda_b)\cdot X^*_f(m)\cdot y_{f,2L}(m), \tag{34}$$

$$\sigma_y{}^2(m)=\lambda_b \cdot \sigma_y{}^2(m-1)+(1-\lambda_b)\cdot y(m)^T \cdot y(m)/L. \tag{35}$$

In some embodiments, $\Phi_{f,xx}(m)$ can be slightly different from $S_f(m)$ defined in (19) due to the approximation $G_{2L\times 2L}{}^{01} \approx I_{2L\times 2L}/2$. Since $\Phi_{f,xx}(m)$ can be a diagonal matrix, its inverse can be straightforward to determine.

The detection statistics can be determined based on the PC vector. For example, a detection statistic may be determined based on the following equation:

$$\xi = \|c_{xy}{}^{PC}\|_2 \tag{36}$$

In some embodiments, the DTD 503 can compare the detection statistic (e.g., the value of $\xi$ or any other detection statistic) to a predetermined threshold and can then detect an occurrence of double-talk based on the comparison. For example, the DTD 503 may determine that double-talk is presented in response to determining that the detection statistic is not greater than the predetermined threshold. As another example, the DTD 503 may determine that double-talk is not present in response to determining that the detection statistic is greater than the predetermined threshold. For example, the determination can be made according to:

$$\begin{cases} \xi < T, & \text{doule-talk} \\ \xi \geq T, & \text{no double-talk} \end{cases}, \tag{36.1}$$

where parameter T can be a predetermined threshold. The parameter T may have any suitable value. In some embodiments, the value of T may fall in a range (e.g., 0<T<1, 0.75≤T≤0.98, etc.).

As another example, the DTD 503 can also perform double-talk detection using a two-filter structure. From (32), the square of the decision statistics $\xi^2$ (m) at time frame m can be rewritten as:

$$\xi^2(m) = \frac{\Phi_{xy}^H(m)\cdot\Phi_{f,xx}^{-1}(m)\cdot\Phi_{xy}(m)}{2L^2\cdot\sigma_y^2(m)} = \frac{\Phi_{xy}^H(m)\cdot\hat{h}_{f,b}(m)}{2L^2\cdot\sigma_y^2(m)}, \tag{37}$$

where $(\cdot)^H$ can denote the Hermitian transpose of one or more matrix or vectors, and $$\hat{h}_{f,b}(m)=\Phi_{f,xx}^{-1}(m)\cdot\Phi_{xy}(m) \tag{38}$$

can be defined as an equivalent "background" filter. The adaptive filter 505 can be updated as follows:

$$e_{f,b}(m)=y_{f,2l}(m)-G_{2L\times 2L}^{01}\cdot X_{f,m}\cdot\hat{h}_{f,b}(m-1), \tag{39}$$

$$\hat{h}_{f,b}(m)=\hat{h}_{f,b}(m-1)+(1-\lambda_b)\cdot[S_f(m)+\delta I_{2L\times 2L}]^{-1}\cdot X^*_f(m)\cdot e_{f,b}(m). \tag{40}$$

As illustrated in equations (33) to (35), the single-pole recursive average can weight the recent past more heavily than the distant past. The corresponding impulse response decays as $\lambda_b^n$(n>0). The value of $\lambda_b$ may be determined based on tracking ability, estimation variance, and/or any other factor. The value of $\lambda_b$ may be a fixed value (e.g., a constant), a variable (e.g., a value determined using the recursion technique described below), etc. In some embodiments, that value of $\lambda_b$ can be chosen to satisfy $0<\lambda_b<1$. In some embodiments, when $\lambda_b$ decreases, the ability to track the variation of an estimated quantity can improve but the variance of the estimate can be raised. For the PC-DTD, $\lambda_b$ can be determined as follows:

$$\lambda_b=e^{-2\cdot(1-\rho)/(f_s\cdot t_{c,b})}, \tag{41}$$

where ρ can be the percentage of overlap; $f_s$ can be the sampling rate; and $t_{c,b}$ can be a time constant for recursive averaging. In some embodiments, the DTD 503 can capture the attack edge of one or more bursts of the local speech v(n) 511 (e.g., an occurrence of a double-talk). The value of $\lambda_b$ may be chosen based on a trade-off between tracking ability and estimation variance. For example, a small value may be assigned to $\lambda_b$ to capture the attack edge of one or more bursts of the local speech. But when $\lambda_b$ is too small, then the decision statistics estimate ξ can fluctuate above the threshold and the double-talk can still continue, which can lead to detection misses.

In some embodiments, the value of the forgetting factor $\lambda_b$ corresponding to a current frame can vary based upon presence or absence of double-talk during one or more previous frames. For example, the value of $\lambda_b$ can be determined using a recursion technique (e.g., a two-sided single-pole recursion technique). The echo cancellation module 330 can govern $t_{c,b}$ by the rule of Eq. (42) as follows:

$$t_{c,b}(m) = \begin{cases} t_{c,b,attack}, \ \xi(m-1) \geq T \text{ (no double-talk)} \\ t_{c,b,decay}, \ \xi(m-1) < T \text{ (double-talk)} \end{cases}, \tag{42}$$

where $t_{c,b,attack}$ can be a coefficient referred to herein as the "attack" coefficient; $t_{c,b,decay}$ can be a coefficient referred to herein as the "decay" coefficient. In some embodiments, the "attack" coefficient and the "decay" coefficient can be chosen to satisfy the following inequality $t_{c,b,attack}<t_c<t_{c,b,decay}$. For example, the echo cancellation module 330 can choose that $t_{c,b,attack}$=300 ms and $t_{c,b,decay}$=500 ms. In some embodiments, when no double-talk was detected in the previous frame, a small $t_{c,b}$ and a small $\lambda_b$ can be used. Alternatively, if the previous frame is already a part of a double-talk (e.g., in response to detecting an occurrence of double-talk in association with the previous frame), then a large $\lambda_b$ can be chosen given that the double-talk would likely last for a while due to nature of speech. This can lead to a smooth variation of ξ and can prevent a possible miss of detection. Moreover, a larger $\lambda_b$ in this situation will make updating of the background filter be slowed down rather than be completely halted (e.g., as for the "foreground" filter).

Figure 6:
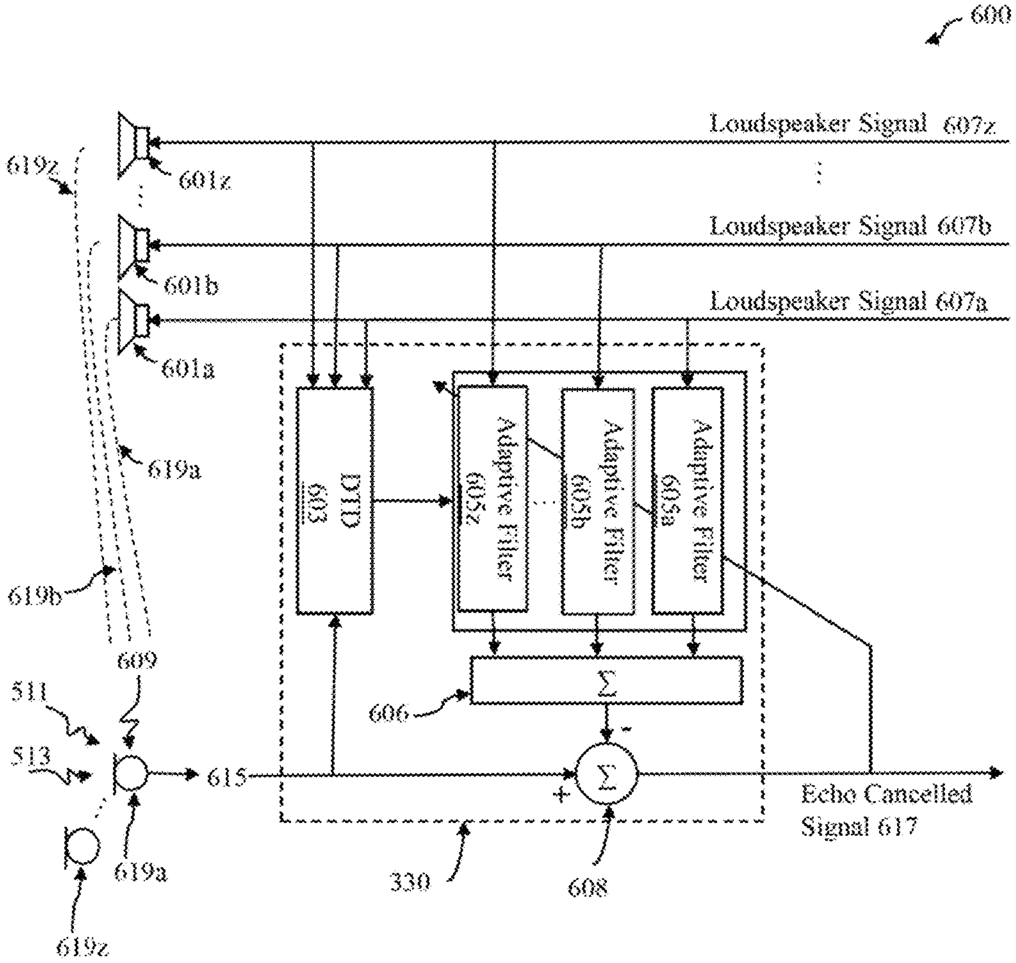
FIG. 6 is a diagram illustrating an example of an acoustic echo canceller in accordance with another embodiment of the present disclosure.

FIG. 6 is a diagram illustrating an example 600 of an AEC system in accordance with another embodiment of the present disclosure.

As shown, AEC 600 can include loudspeakers 601*a-z*, one or more DTDs 603, adaptive filters 605*a-z*, one or more combiners 606 and 608, audio sensors 619*a* and 619*z*, and/or any other suitable component for performing acoustic echo cancellation. More or less components may be included in AEC 600 without loss of generality. For example, two of the modules may be combined into a single module, or one of the modules may be divided into two or more modules. In one implementation, one or more of the modules may reside on different computing devices (e.g., different server computers).

In some embodiments, one or more components of AEC 600 may be included in the echo cancellation module 330 of FIG. 3. For example, as illustrated in FIG. 6, the echo cancellation module 330 may include the DTD 603, the adaptive filter 605*a-z*, the combiner 606, and the combiner 608. In some embodiments, DTD 603 of FIG. 6 may be the same as DTD 503 of FIG. 5.

Each of loudspeakers 601*a-z* can be and/or include any device that can convert an audio signal into a corresponding sound. Each of loudspeakers 601*a-z* may be a stand-alone device or be integrated with one or more other devices. For example, each of loudspeakers 601*a-z* may be built-in loudspeakers of an automobile audio system, loudspeakers integrated with a mobile phone, etc. While a certain number of loudspeakers, audio sensors, adaptive filters, etc. are illustrated in FIG. 6, this is merely illustrative. Any number of loudspeakers, audio sensors, adaptive filters, etc. may be included in AEC 600.

The loudspeakers 601*a, b*, and *z* can output loudspeaker signals 607*a, b*, and *z*, respectively. The loudspeaker signals

607$a$-$z$ may pass through their corresponding acoustic paths (e.g., acoustic paths 619$a$-$z$) and may produce an echo signal 609. The echo signal 609 can be captured by the audio sensor 603$a$ and/or 603$b$ together with a local speech signal 511, a local noise signal 513, and/or any other signal that can be captured by an audio sensor 619$a$-$z$.

Each of audio sensors 619$a$-$z$ may output an output signal 615. The echo cancellation module 330 can model the acoustic paths 619$a$-$z$ using the adaptive filters 605$a$, 605$b$, and 605$z$ to estimate the echo signal 609. The adaptive filters 605$a$-$z$ may be and/or include a filter with a finite impulse response (FIR) to generate the echo signal 609. The echo cancellation module 330 can then estimate the filters using an adaptive algorithm.

The adaptive filters 605$a$-$z$ may receive the loudspeaker signals 607$a$-$z$, respectively. Each of the adaptive filters can then generate and output an estimated echo signal corresponding to one of the loudspeaker signals. The outputs of the adaptive filters 605$a$-$z$ may represent estimated echo signals corresponding to loudspeaker signals 607$a$-$z$. The combiner 606 may combine the outputs to produce a signal representative of an estimate of the echo signal 609 (e.g., signal. 9 ($n$)).

In some embodiments, before loudspeaker signals 607$a$-$z$ are supplied to adaptive filters 605$a$-$z$, a transformation may be performed on one or more of the loudspeaker signals to reduce the correlation of the loudspeaker signals. For example, the transformation may include a zero-memory non-linear transformation. More particularly, for example, the transformation may be performed by adding a half-wave rectified version of a loudspeaker signal to the loudspeaker signal and/or by applying a scale factor that controls the amount of non-linearity. In some embodiments, the transformation may be performed based on equation (48). As another example, the transformation may be performed by adding uncorrelated noise (e.g., white Gaussian noise, Schroeder noise, etc.) to one or more of the loudspeaker signals. As still another example, time-varying all pass filters may be applied to one or more of the loudspeaker signals.

In some embodiments, a transformation may be performed on each of loudspeaker signals 607$a$-$z$ to produce a corresponding transformed loudspeaker signal. Adaptive filters 605$a$-$z$ can process the transformed loudspeaker signals corresponding to loudspeaker signals 607$a$-$z$ to produce an estimate of the echo signal 609.

The combiner 608 can generate an echo cancelled signal 617 by combining the estimated echo signal $\hat{y}(n)$ and the output signal 615. For example, the echo cancelled signal 617 can be generated by subtracting the estimated echo signal from the output signal 615 to achieve echo and/or feedback cancellation.

As illustrated in FIG. 6, the acoustic echo $y_e(n)$ 609 captured by one of an audio sensors 619$a$-$z$ can be due to K different, but highly correlated loudspeaker signals 607$a$-$z$ coming from their corresponding acoustic paths 619$a$-$z$, where K≥2. The output signal 615 of the audio sensor 619$a$ can be modeled based on the true acoustic impulse response and can include one or more components corresponding to the echo signal 609, the speech signal 511, the local noise signal 513, etc. For example, the output signal 615 of an audio sensor may be modeled as follows:

$$y(n)=\Sigma_{k=1}^{K} x_k^T(n)\cdot h_k+w(n), \quad (43)$$

where the definition in the echo cancellation module 330 can be as follows:

$$x_k(n) \triangleq [x_k(n) x_k(n-1) \ldots x_k(n-L+1)]^T, \quad (43.1)$$

$$h_k \triangleq [h_{k,0} h_{k,1} \ldots h_{k,L-1}]^T. \quad (43.2)$$

In equation (43), $x_k(n)$ corresponds to the loudspeaker signals 607$a$-$z$; w(n) corresponds to the sum of the local speech signal 511 and the local noise signal 513.

The echo cancellation module 330 can define the stacked vectors x(n) and h(n) as follows:

$$x(n) \triangleq [x_1^T(n) x_2^T(n) \ldots x_K^T(n)]^T \quad (43.3)$$

$$h \triangleq [h_1^T h_2^T \ldots h_K^T]. \quad (43.4)$$

Equation (43) can be written as:

$$y(n)=x_T(n)\cdot h+w(n), \quad (44)$$

The lengths of x(n) and h can be KL. In some embodiments, the posteriori error signal ε(n) and its associated cost function J can be defined as follows:

$$\varepsilon(n) \triangleq y(n)-\hat{y}(n)=x^T(n)[h-\hat{h}(n)]+w(n), \quad (45)$$

$$J \triangleq E\{\varepsilon^2(n)\}. \quad (46)$$

By minimizing the cost function, the echo cancellation module 330 can deduce the Winer filter as follows:

$$\hat{h}_W = \arg\min_{\hat{h}_n} J = R_{xx}^{-1}\cdot r_{xy}, \quad (47)$$

where $$R_{xx} \triangleq E\{x(n)\cdot x^T(n)\} = \begin{bmatrix} E\{x_1(n)\cdot x_1^T(n)\} & E\{x_1(n)\cdot x_2^T(n)\} & \ldots & E\{x_1(n)\cdot x_K^T(n)\} \\ E\{x_2(n)\cdot x_1^T(n)\} & E\{x_2(n)\cdot x_2^T(n)\} & & E\{x_2(n)\cdot x_K^T(n)\} \\ \vdots & & \ddots & \vdots \\ E\{x_K(n)\cdot x_1^T(n)\} & E\{x_K(n)\cdot x_2^T(n)\} & \ldots & E\{x_K(n)\cdot x_K^T(n)\} \end{bmatrix}, \quad (47.1)$$

$$r_{xy} \triangleq \{x(n)\cdot y(n)\} = \begin{bmatrix} E\{x_1(n)\cdot y(n)\} \\ E\{x_2(n)\cdot y(n)\} \\ \vdots \\ E\{x_K(n)\cdot y(n)\} \end{bmatrix}. \quad (47.2)$$

In the multi-loudspeaker AEC system 600, the loudspeaker signals 607$a$-$z$ can be correlated. In some embodiments, the adaptive algorithms that are developed for the single-loudspeaker case is not directly applied to multi-loudspeaker echo cancellation. Because the desired filters [e.g., $\hat{h}_k(n)\rightarrow h_k$ (k=1, 2, . . . , K)] cannot be obtained, while driving the posteriori error ε(n) to a value. For example, the value can be 0.

The challenge of solving this problem can be to reduce the correlation of multiple loudspeaker signals x (n) 507 to a level. The level can be adequate to make the adaptive algorithm converge to the right filters, yet low enough to be perceptually negligible. In some embodiments, the echo cancellation module 330 can add a half-wave rectified version of a loudspeaker signal to the loudspeaker signal. The loudspeaker signal can also be scaled by a constant α to control the amount of non-linearity. In some embodiments, the transformation may be performed based on the following equation:

$$\hat{x}_k(n) = x_k(n) + \alpha\cdot\frac{x_k(n)+|x_k(n)|}{2}, \quad k = 1, 2, \ldots, K. \quad (48)$$

The adaptive filters 605$a$-$z$ can correspond to the loudspeakers 601$a$-$z$. In some embodiments, the number of the adaptive filters 605*a-z* and the number of loudspeakers 601*a-z* may or may not be the same. The adaptive filters 605*a-z* can be estimated and a sum of the estimated adaptive filters 605*a-z* can be subtracted from the audio sensor 619*a*'s output signal 615 to achieve acoustic echo and/or feedback cancellation.

Figure 7:
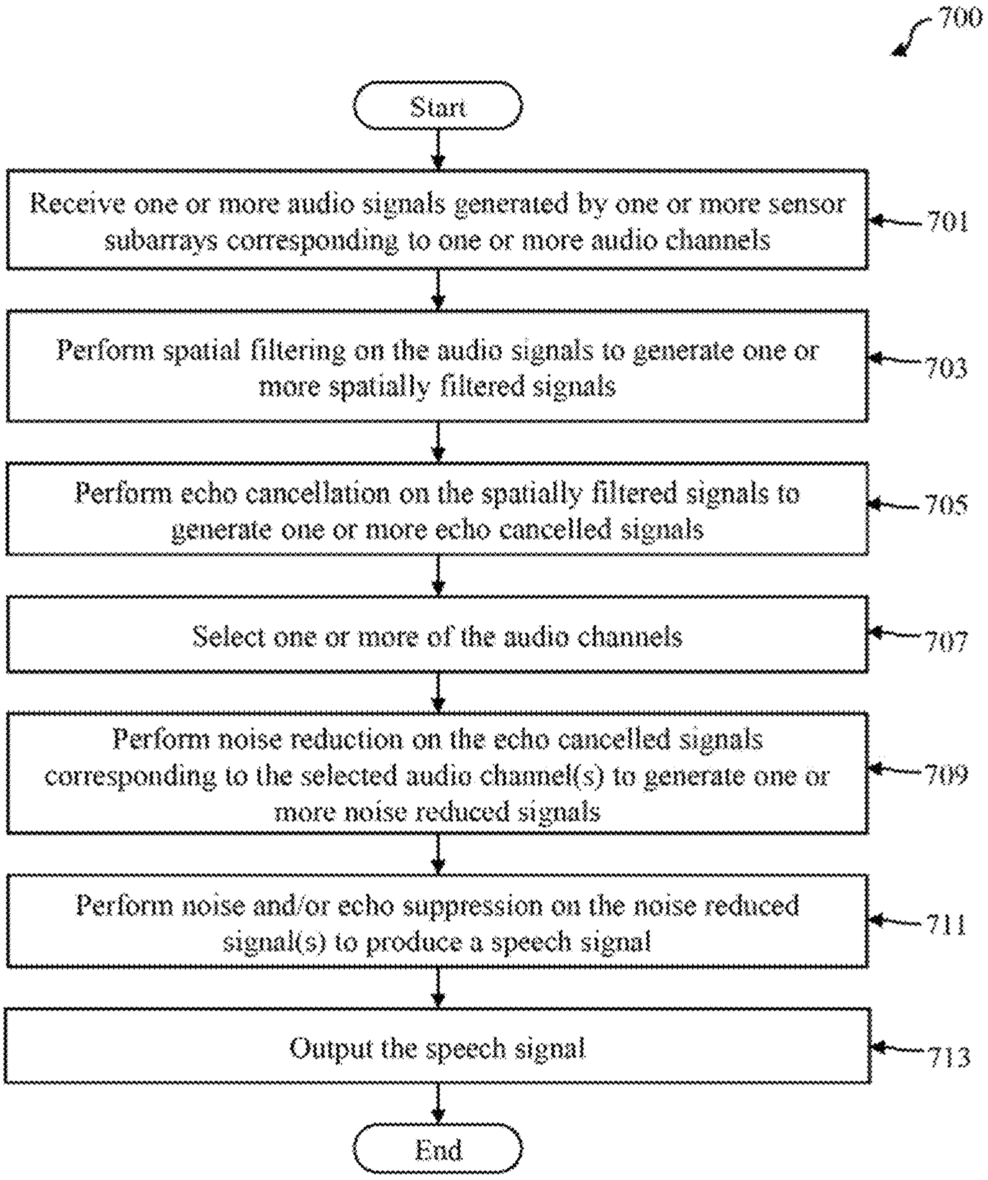
FIG. 7 shows a flow chart illustrating an example of a process for processing audio signals for voice communication in accordance with some embodiments of the disclosed subject matter.

FIG. 7 shows a flow chart illustrating an example 700 of a process for processing audio signals in accordance with some embodiments of the disclosed subject matter. In some embodiments, one or more operations of the method 700 can be performed by one or more processors (e.g., one or more processors 120 as described below in connection with FIGS. 1-6).

As shown, process 700 can begin by receiving one of more audio signals generated by one or more microphone subarrays corresponding to one or more audio channels at 701. Each of the audio signals can include, but is not limited to, a speech component, a local noise component, and an echo component corresponding to one or more loudspeaker signals, the like, or any combination thereof. In some embodiments, the sensor subarrays in the disclosure can be MEMS microphone subarrays. In some embodiments, the microphone subarrays may be arranged as described in connection with FIGS. 2A-B.

At 703, process 700 can perform spatial filtering on the audio signals to generate one or more spatially filtered signals. In some embodiments, one or more operations of spatial filtering can be performed by the spatial filtering module 320 as described in connection with FIGS. 3-4

In some embodiments, a spatially filtered signal may be generated by perform spatial filtering on an audio signal produced by a microphone subarray. For example, a spatially filtered signal may be generated for each of the received audio signals. Alternatively or additionally, a spatially filtered signal may be generated by performing spatial filtering on a combination of multiple audio signals produced by multiple microphone subarrays.

A spatially filtered signal may be generated by performing any suitable operation. For example, the spatially filtered signal may be generated by performing beamforming on one or more of the audio signals using one or more beamformers. In some embodiments, the beamforming may be performed by one or more beamformers as described in connection with FIGS. 3-4 above. As another example, the spatially filtered signal may be generated by equaling output signals of the beamformer(s) (e.g., by applying a low-pass filter to the output signals). In some embodiments, the equalization may be performed by one or more low-pass filters as described in connection with FIGS. 3-4 above. The spatial filtering may be performed by performing one or more operations described in connection with FIG. 8 below.

At 705, process 700 can perform echo cancellation on the spatially filtered signals to generate one or more echo cancelled signals. For example, echo cancellation may be performed on a spatially filtered signal by estimating an echo component of the spatially filtered signal and subtracting the estimated echo component from the spatially filtered signal. The echo component may correspond to one or more speaker signals produced by one or more loudspeakers. The echo component may be estimated based on an adaptive filter that models an acoustic path via which the echo component is produced.

In some embodiments, the echo cancellation can be performed by an echo cancellation module described in connection with FIGS. 3, 5, and 6. The algorithm used to cancel the echo and feedback of the audio signals can include, but is not limit to, normalized least mean square (NLMS), affine projection (AP), block least mean square (BLMS) and frequency-domain (FLMS) algorithm, the like, or any combination thereof. In some embodiments, echo cancellation may be performed by performing one or more operations described in connection with FIG. 9 below.

At 707, process 700 can select one or more audio channels. The selection can be made by the noise reduction module 340 as shown in FIG. 3 (e.g., the channel selection unit 342). In some embodiments, the selection can be based on one or more characteristics of the audio signals, using a statistics or cluster algorithm. In some embodiments, one or more audio channels can be selected based on quality of audio signals provided via the audio channels. For example, one or more audio channels can be selected based on the signal to noise ratios (SNRs) of the audio signals provided by the audio channels. More particularly, for example, channel selection unit 342 may select one or more audio channels that are associated with particular quality (e.g., particular SNRs), such as the highest SNR, the top three SNRs, SNRs higher than a threshold, etc. In some embodiments, the selection can be made based on user setting, adaptive computing, the like, or any combination thereof. In some embodiments, 707 can be omitted from process 700. Alternatively or additionally, a selection of all of the audio channels may be made in some embodiments.

At 709, process 700 can perform noise reduction on the echo cancelled signals corresponding to the selected audio channel(s) to generate one or more denoised signals. Each of the denoised signals may correspond to a desired speech signal. In some embodiments, the noise reduction can be performed by the noise reduction module 340 as shown in FIG. 3. For example, the MCNR unit 344 can construct one or more noise reduction filters and can apply the noise reduction filter(s) to the echo cancelled signals. In some embodiments, the noise reduction can be performed by performing one or more operations described below in connection with FIG. 10.

At 711, process 700 can perform noise and/or echo suppression on the noise reduced signal(s) to produce a speech signal. In some embodiments, the residual noise and echo suppression can be performed by the residual noise and echo suppression unit 346 of the noise reduction module 340. For example, the residual noise and echo suppression unit 346 can suppress residual noise and/or echo that is not removed by the MCNR unit 344.

At 713, process 700 can output the speech signal. The speech signal can be further processed to provide various functionalities. For example, the speech signal can be analyzed to determine content of the speech signal (e.g., using one or more suitable speech recognition techniques and/or any other signal processing technique). One or more operations can then be performed based on the analyzed content of the speech signal by process 700 and/or any other process. For example, media content (e.g., audio content, video content, images, graphics, text, etc.) can be presented based on the analyzed content. More particularly, for example, the media content may relate to a map, web content, navigation information, news, audio clips, and/or any other information that relates to the content of the speech signal. As another example, a phone call may be made for a user. As still another example, one or more messages can be sent, received, etc. based on the speech signal. As yet another example, a search for the analyzed content may be performed (e.g., by sending a request to a server that can perform the search).

Figure 8:
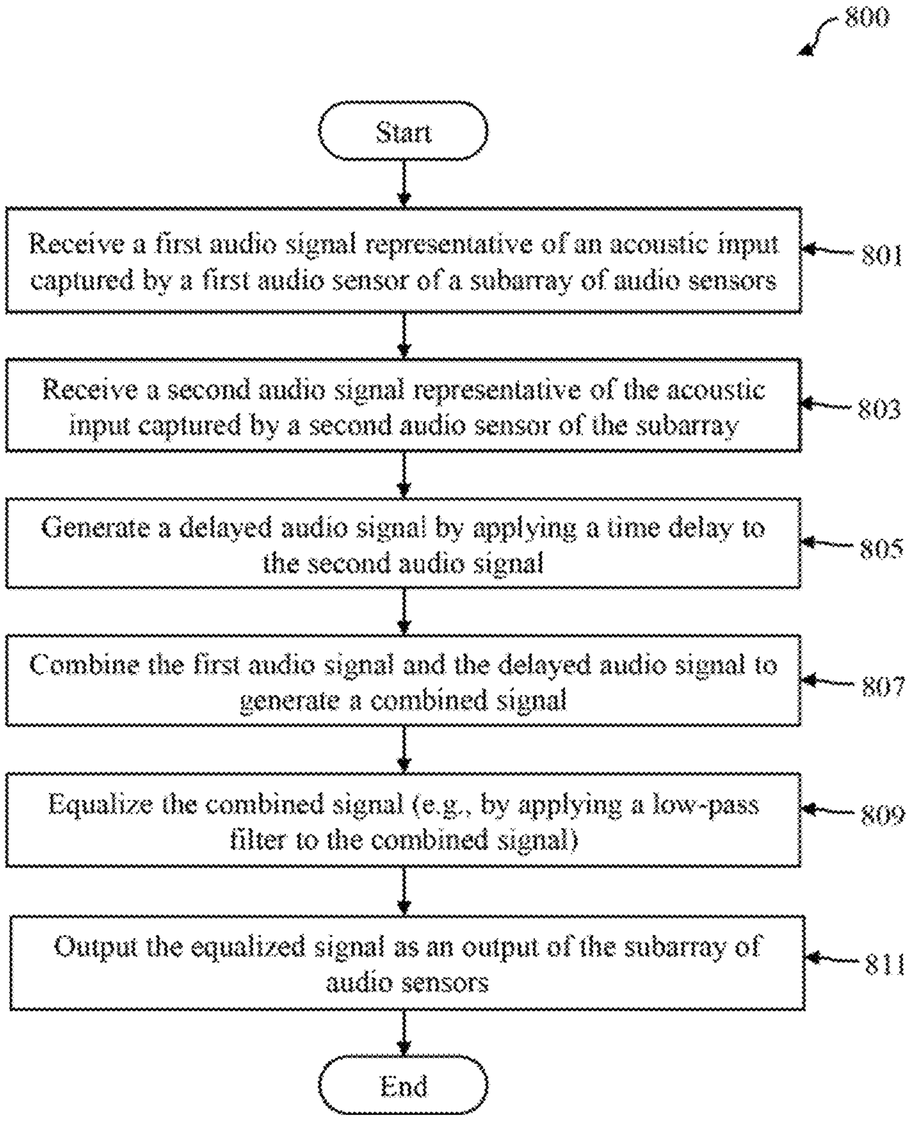
FIG. 8 is a flow chart illustrating an example of a process for spatial filtering in accordance with some embodiments of the disclosed subject matter.

FIG. 8 is a flow chart illustrating an example 800 of a process for spatial filtering in accordance with some embodiments of the disclosed subject matter. In some embodiments, process 800 can be executed by one or more processors executing the spatial filtering module 320 as described in connection with FIGS. 1-4.

At 801, process 800 can receive a first audio signal representative of an acoustic input captured by a first audio sensor of a subarray of audio sensors. The acoustic input may correspond to a user's voice and/or any other input from one or more acoustic sources. At 803, process 800 can receive a second audio signal representative of the acoustic input captured by a second audio sensor of the subarray. In some embodiments, the first audio signal and the second audio signal can be the same or different. The first audio single and the second audio signal can be received simultaneously, substantially simultaneously, and/or in any other manner. Each of the first audio sensor and the second audio sensor can be and/or include any suitable audio sensor, such as an audio sensor 110 of the system 100 as described in connection with FIG. 1. The first audio sensor and the second audio sensor may be arranged to form a microphone subarray, such as a microphone subarray described in connection with FIGS. 2A, 2B, and 4.

At 805, process 800 can generate a delayed audio signal by applying a time delay to the second audio signal. In some embodiments, the delayed audio signal may be generated by the beamformer(s) 322 of the spatial filtering module 320 as shown in FIG. 3 (e.g., the delay module 430 as shown in FIG. 4). In some embodiments, the time delay may be determined and applied based on a distance between first audio sensor and the second audio sensor. For example, the time delay can be calculated based on equations (2.1) and/or equation (2.2).

At 807, process 800 can combine the first audio signal and the delayed audio signal to generate a combined signal. In some embodiments, the combined signal may be generated by the beamformer(s) 322 of the spatial filtering module 320 as shown in FIG. 3 (e.g., the combining module 440 as shown in FIG. 4). The combined signal can be represented using equations (1) and/or (2).

At 809, process 800 can equalize the combined signal. For example, the process 800 can equalize the combined signal by applying a low-pass filter (e.g., the low-pass filter(s) 324 of FIG. 3) to the combined signal.

At 811, process 800 can output the equalized signal as an output of the subarray of audio sensors.

Figure 9:
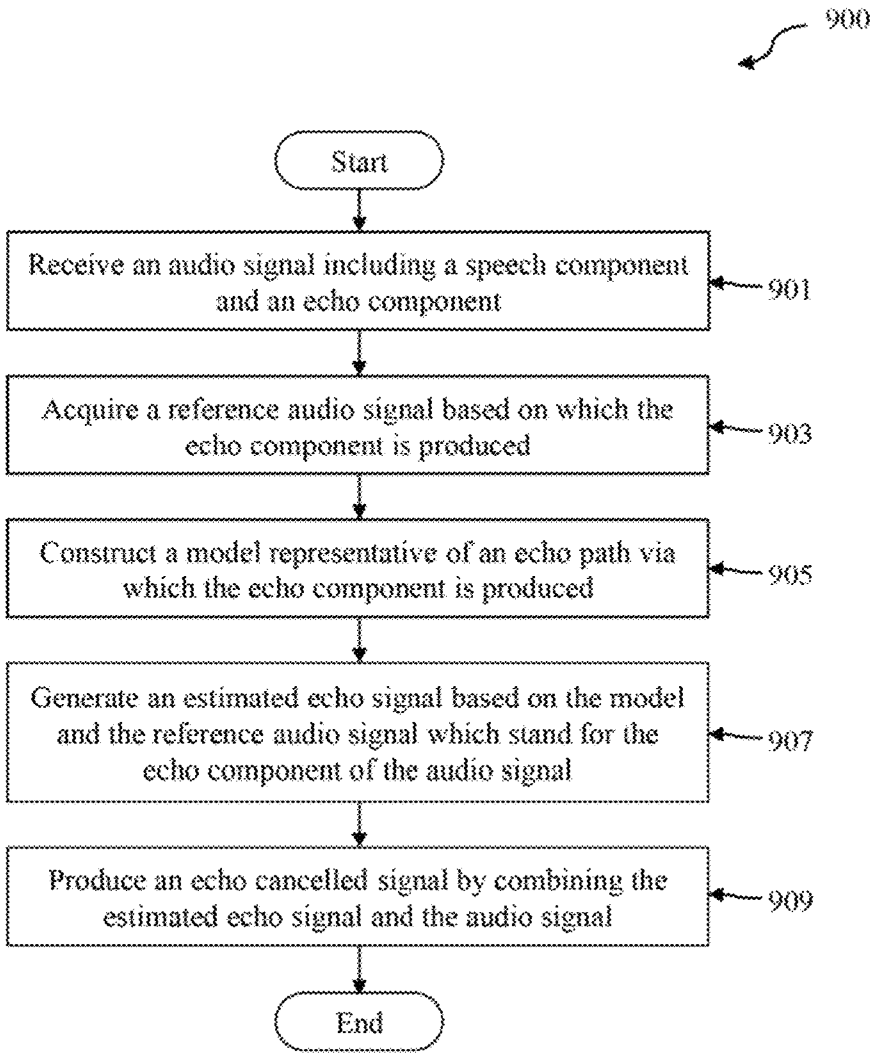
FIG. 9 is a flow chart illustrating an example of a process for echo cancellation in accordance with some embodiments of the disclosed subject matter.

FIG. 9 is a flow chart illustrating an example 900 of a process for echo cancellation in accordance with some embodiments of the disclosed subject matter. In some embodiments, process 900 can be executed by one or more processors executing the echo cancellation module 330 of FIG. 3.

At 901, process 900 can receive an audio signal including a speech component and an echo component. The audio signal may include any other component that can be captured by an audio sensor. In some embodiments, the echo component and the speech component can correspond to the echo signal 509 and the local speech signal 511 as described in connection with FIG. 5 above.

At 903, process 900 can acquire a reference audio signal from which the echo component is produced. In some embodiments, the reference audio signal can be and/or include one or more loudspeaker signals as described in connection with FIGS. 5-6 above. Alternatively or additionally, the reference audio signal may include one or more signals generated based on the loudspeaker signal(s). For example, the reference audio signal may include a transformed signal that is generated based on a loudspeaker signal (e.g., based on equation (48)).

At 905, process 900 can construct a model representative of an acoustic path via which the echo component is produced. For example, the acoustic path can be constructed using one or more adaptive filters. In some embodiments, there can be one or more models representative of one or more acoustic paths. The acoustic path model can be an adaptive acoustic path model, an open acoustic path model, a linear acoustic path model, a non-linear acoustic path model, the like, or any combination thereof. In some embodiments, the model may be constructed based on one or more of equations (5)-(48).

At 907, process 900 can generate an estimated echo signal based on the model and the reference audio signal. For example, the estimated echo signal may be and/or include an output signal of an adaptive filter constructed at 606. In some embodiments, as described in connection with FIG. 6, the estimated echo signal may be a combination of outputs produced by multiple adaptive filters.

At 909, process 900 can produce an echo cancelled signal by combining the estimated echo signal and the audio signal. For example, the echo cancelled signal may be produced by subtracting the estimated echo signal from the audio signal.

Figure 10:
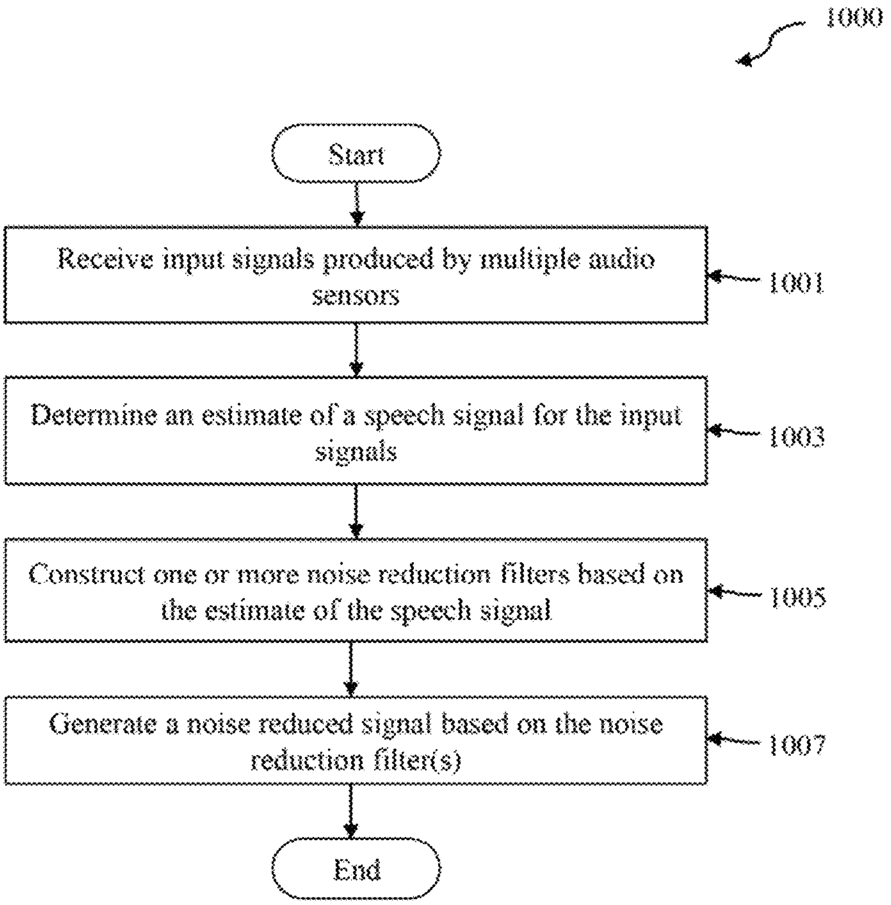
FIG. 10 is a flow chart illustrating an example of a process for multichannel noise reduction in accordance with some embodiments of the disclosed subject matter.

FIG. 10 is a flow chart illustrating an example 1000 of a process for multichannel noise reduction in accordance with some embodiments of the disclosed subject matter. In some embodiments, process 1000 may be performed by one or more processors executing the noise reduction module 340 of FIG. 3.

At 1001, process 1000 can receive input signals produced by multiple audio sensors. The audio sensors may form an array (e.g., a linear array, a differential array, etc.). Each of the audio signals may include a speech component, a noise component, and/or any other component. The speech component may correspond to a desired speech signal (e.g., a signal representative of a user's voice). The speech component may be modeled based on a channel impulse response from an unknown source. The noise component may correspond to eminent noise and/or any other type of noise. In some embodiments, the input signals may be and/or output signals of the audio sensors. Alternatively, the input signals may be and/or include signals produced by the spatial filtering module 320 of FIG. 3, the echo cancellation module 330 of FIG. 3, and/or any other device.

In some embodiments, the output signals may be produced by a certain number of audio sensors that form an array (e.g., P audio sensors). Process 1000 may model the output signals of the audio sensors as follows $$y_p(n) = g_p \cdot s(n) + v_p(n) \tag{49}$$

$$= x_p(n) + v_p(n), \quad p = 1, 2, \ldots P, \tag{50}$$

where p is an index of the audio sensors; $g_p$ can be the channel impulse response from the unknown source s(n) to the pth audio sensor; and $v_p(n)$ can be the noise at audio sensor p. In some embodiments, the frontend can include differential audio sensor subarrays. The channel impulse response can include both the room impulse response and the differential array's beam pattern. The signals $x_p(n)$ and $v_p(n)$ can be uncorrelated and zero-mean.

In some embodiments, the first audio sensor can have the highest SNR. For example, process 1000 can rank the output signals by SNR and can re-index the output signals accordingly.

In some embodiments, the MCNR unit can transform one or more of the output signals from the time or space domain to the frequency domain and vice versa. For example, a time-frequency transformation can be performed on each of the audio signals. The time-frequency transformation may be and/or include, for example, the fast Fourier transform, the wavelet transform, the Laplace transform, the Z-transform, the like, or any combination thereof. The FFT can include, but is not limited to, Prime-factor FFT algorithm, Bruun's FFT algorithm, Rader's FFT algorithm, Bluestein's FFT algorithm, etc.

For example, process 1000 can transform Eq. (49) to the frequency domain using the short-time Fourier transform (STFT) and yield the following equation $$Y_p(j\omega) = G_p(j\omega)\cdot S(j\omega) + V_p(j\omega) \tag{51}$$

$$= X_p(j\omega) + V_p(j\omega),\quad p = 1, 2, \ldots P, \tag{52}$$

where $j \triangleq \sqrt{-1}$, ω can be the angular frequency, $Y_p(j\omega)$, $S(j\omega)$, $G_p(j\omega)$, $X_p(j\omega)=G_p(j\omega)\cdot S(j\omega)$, and $V_p(j\omega)$ can be the STFT of $y_p(n)$, $s(n)$, $g_p$, $x_p(n)$, and $v_p(n)$, respectively.

At 1003, process 1000 can determine an estimate of a speech signal for the input audio signals. For example, the estimation may be performed by determining one or more power spectral density (PSD) matrices for the input signals. More particularly, for example, the PSD of a given input signal (e.g., the pth input audio signal) $y_p(n)$ can be determined as follows:

$$\Phi_{y_p y_p}(\omega) = \Phi_{x_p x_p}(\omega) + \Phi_{v_p v_p}(\omega) \tag{53}$$

$$= |G_p(j\omega)|^2\cdot\Phi_{ss}(\omega) + \Phi_{v_p v_p}(\omega),\quad p = 1, 2, \ldots P, \tag{54}$$

where $$\Phi_{ab}(j\omega) \triangleq E\{A(j\omega)\cdot B^*(j\omega)\} \tag{55}$$

can be cross-spectrum between the two signals a(n) and b(n), $\phi_{aa}(\omega)$ and $\phi_{bb}(\omega)$ can be their respective PSDs, $E\{\cdot\}$ can denote mathematical expectation, $(\cdot)^*$ can denote complex conjugate. In time series analysis, the cross-spectrum can be used as part of a frequency domain analysis of the cross-correlation or cross-covariance between two time series.

In some embodiments, process 1000 can obtain a linear estimate of $X_1(j\omega)$ from the P audio sensor signals as follows $$\begin{aligned} Z(j\omega) &= H_1^*(j\omega)\cdot Y_1(j\omega) + H_2^*(j\omega)\cdot Y_2(j\omega) + \ldots + H_P^*(j\omega)\cdot Y_P(j\omega) \\ &= h^H(j\omega)\cdot y(j\omega) \quad (56.0) \\ &= h^H(j\omega)\cdot[x(j\omega) + v(j\omega)], \quad (56) \end{aligned}$$

where $$y(j\omega) \triangleq [\,Y_1(j\omega)\quad Y_2(j\omega)\quad \ldots\quad Y_P(j\omega)\,]^T,$$

$$x(j\omega) \triangleq S(j\omega)\cdot[\,G_1(j\omega)\quad G_2(j\omega)\quad \ldots\quad G_P(j\omega)\,]^T = S(j\omega)\cdot g(j\omega).$$

In some embodiments, process 1000 can define $v(j\omega)$ in a similar way as $y(j\omega)$, and $$h(j\omega) \triangleq [H_1(j\omega)H_2(j\omega)\ \ldots\ H_p(j\omega)]^T$$

can be a vector containing P noncausal filter to be determined. The PSD of z(n) can be then found as follows $$\Phi_{zz}(\omega)=h^H(j\omega)\cdot\Phi_{xx}(j\omega)\cdot h(\omega)+h^H(j\omega)\cdot\Phi_{vv}(j\omega)\cdot h(\omega) \tag{57}$$

where $$\Phi_{xx}(j\omega) \triangleq E\{x(j\omega)\cdot x^H(j\omega)\}=\phi_{ss}(\omega)\cdot g(j\omega)\cdot g^H(j\omega) \tag{58}$$

$$\Phi_{vv}(j\omega) \triangleq E\{v(j\omega)\cdot v^H(j\omega)\} \tag{59}$$

can be the PSD matrices of the signals $x_p(n)$ and $v_p(n)$, respectively. The rank of the matrix $\Phi_{xx}(j\omega)$ can be equal to 1.

At 1005, process 1000 can construct one or more noise reduction filters based on the estimate of the speech component. For example, a Wiener filter may be constructed based on the estimate of the speech component, one or more PSD matrices of the speech components and/or noise components of the input signals, and/or any other information.

More particularly, for example, process 1000 can produce an error signal based on the speech component and the corresponding linear estimate. In some embodiments, process 1000 can produce the error signal based on the following equation:

$$\varepsilon(j\omega) \triangleq X_1(j\omega) - Z(j\omega) = X_1(j\omega) - h^H(j\omega)\cdot y(j\omega) = [u - h(j\omega)]^H\cdot x(j\omega) - h^H(j\omega)\cdot v(j\omega) \tag{60}$$

where $$u \triangleq [1\ 0\ \ldots\ 0]^T$$

can be a vector of length P. The corresponding mean squared error (MSE) can be expressed as follows:

$$J[h(j\omega)] \triangleq E\{|\varepsilon(j\omega)|^2\}. \tag{61}$$

The MSE of an estimator can measure the average of the squares of the "errors", that is, the difference between the estimator and what is estimated.

Process 1000 can deduce the Wiener solution $h_W(j\omega)$ by minimizing the MSE as follows $$h_W(j\omega) = \arg\min_{h(j\omega)} J[h(j\omega)]. \tag{62}$$

The solution for equation (62) can be expressed as $$h_W(j\omega) = \Phi_{yy}^{-1}(j\omega)\cdot\Phi_{xx}(j\omega)\cdot u \quad (63.0)$$

$$= [I_{P\times P} - \Phi_{yy}^{-1}(j\omega)\cdot\Phi_{vv}(j\omega)]\cdot u \tag{63}$$

where $$\Phi_{yy}(j\omega) \triangleq E\{y(j\omega)\cdot y^H(j\omega)\} \quad (64.0)$$

$$= \Phi_{ss}(\omega)\cdot g(j\omega)\cdot g^H(j\omega) + \Phi_{vv}(j\omega) \tag{64}$$

$$\Phi_{vv}(j\omega) \triangleq E\{v(j\omega)\cdot v^H(j\omega)\}$$

Process 1000 can determine the inverse of $\Phi_{yy}(j\omega)$ from equation (64) by using Woodbury's identity as follows $$\Phi_{yy}^{-1}(j\omega) = [\Phi_{ss}(\omega)\cdot g(j\omega)\cdot g^H(j\omega) + \Phi_{vv}(j\omega)]^{-1} \quad (65.0)$$

$$= \Phi_{vv}^{-1}(j\omega) - \frac{\Phi_{vv}^{-1}(j\omega)\cdot g(j\omega)\cdot g^H(j\omega)\cdot\Phi_{vv}^{-1}(j\omega)}{\Phi_{ss}^{-1}(\omega) + g^H(j\omega)\cdot\Phi_{vv}^{-1}(j\omega)\cdot g(j\omega)} \quad (65.1)$$

-continued $$= \Phi_{vv}^{-1}(j\omega) + \frac{\Phi_{vv}^{-1}(j\omega)\cdot\Phi_{xx}(j\omega)\cdot\Phi_{vv}^{-1}(j\omega)}{1+tr[\Phi_{vv}^{-1}(j\omega)\cdot\Phi_{xx}(j\omega)]} \quad (65)$$

where tr[·] can denote the trace of a matrix. By using Woodbury's identity, the inverse of a rank-k correction of some matrix can be computed by doing a rank-k correction to the inverse of the original matrix. Process 1000 can substitute equation (65) into equation (63) to yield other formulations of the Wiener filter as follows $$h_W(j\omega) = \frac{\Phi_{vv}^{-1}(j\omega)\cdot\Phi_{xx}(j\omega)}{1+tr[\Phi_{vv}^{-1}(j\omega)\cdot\Phi_{xx}(j\omega)]}\cdot u \quad (66)$$

$$= \frac{\Phi_{vv}^{-1}(j\omega)\cdot\Phi_{yy}(j\omega) - I_{P\times P}}{1-P+tr[\Phi_{vv}^{-1}(j\omega)\cdot\Phi_{yy}(j\omega)]}\cdot u \quad (67)$$

In some embodiments, process 1000 can update the estimates of $\Phi_{yy}(j\omega)$ and $\Phi_{vv}(j\omega)$ using the single-pole recursion technique. Each of the estimates of $\Phi_{yy}(j\omega)$ and $\Phi_{vv}(j\omega)$ can be updated continuously, during silent periods, and/or in any other suitable manner.

As another example, process 1000 can construct a multichannel noise reduction (MCNR) filter using the minimum variance distortionless response (MVDR) approach. The constructed filter is also referred to herein as the "MVDR filter." The MVDR filter can be designed based on equation (56). The MVDR filter can be constructed to minimize the level of noise in the MCNR output without distorting the desired speech signal. The MCNR can be constructed by solving a constrained optimization problem defined as follows:

$$h_{MVDR}(j\omega) \triangleq \arg\min h^H(j\omega)\cdot\Phi_{vv}(j\omega)\cdot h(j\omega),$$

$$\text{subject to } h^H(j\omega)\cdot g(j\omega)=G_1(j\omega). \quad (68)$$

Lagrange multipliers can be used to solve equation (68) and to produce:

$$h_{MVDR}(j\omega) = G_1^*(j\omega)\cdot\frac{\Phi_{vv}^{-1}(j\omega)\cdot g(j\omega)}{g^H(j\omega)\cdot\Phi_{vv}^{-1}(j\omega)\cdot g(j\omega)}. \quad (69)$$

In some embodiments, the solution to equation (68) may also be represented as:

$$h_{MVDR}(j\omega) = \frac{\Phi_{vv}^{-1}(j\omega)\cdot\Phi_{xx}(j\omega)}{tr[\Phi_{vv}^{-1}(j\omega)\cdot\Phi_{xx}(j\omega)]}\cdot u \quad (70)$$

$$= \frac{\Phi_{vv}^{-1}(j\omega)\cdot\Phi_{yy}(j\omega) - I_{P\times P}}{tr[\Phi_{vv}^{-1}(j\omega)\cdot\Phi_{yy}(j\omega)]-P}\cdot u. \quad (71)$$

Process 1000 can compare equations (66) and (70) to obtain:

$$h_W(j\omega) = h_{MVDR}(j\omega)\cdot H'(\omega), \quad (72)$$

where $$H'(\omega) = \frac{tr[\Phi_{vv}^{-1}(j\omega)\cdot\Phi_{xx}(j\omega)]}{1+tr[\Phi_{vv}^{-1}(j\omega)\cdot\Phi_{xx}(j\omega)]}. \quad (73)$$

Based on equation (70), the MVDR filter can be constructed based on:

$$H'(\omega) = \frac{h_{MVDR}^H(j\omega)\cdot\Phi_{xx}(j\omega)\cdot h_{MVDR}(j\omega)}{h_{MVDR}^H(j\omega)\cdot\Phi_{yy}(j\omega)\cdot h_{MVDR}(j\omega)}. \quad (74)$$

Equation (74) may represent the Wiener filter for single-channel for noise reduction (SCNR) after applying MCNR using the MVDR filter.

At 1007, process 1000 unit can generate a noise reduced signal based on the noise reduction filter(s). For example, process 1000 can apply the noise reduction filter(s) to the input signals.

It should be noted that the above steps of the flow diagrams of FIGS. 7-10 can be executed or performed in any order or sequence not limited to the order and sequence shown and described in the figures. Also, some of the above steps of the flow diagrams of FIGS. 7-10 can be executed or performed substantially simultaneously where appropriate or in parallel to reduce latency and processing times. Furthermore, it should be noted that FIGS. 7-10 are provided as examples only. At least some of the steps shown in these figures can be performed in a different order than represented, performed concurrently, or altogether omitted. For example, 709 can be performed after 705 without the step of 705. As another example, 707, 709, 711 can be performed after the receiving of the multiple audio signals using one or more sensor subarrays.

Figure 11:
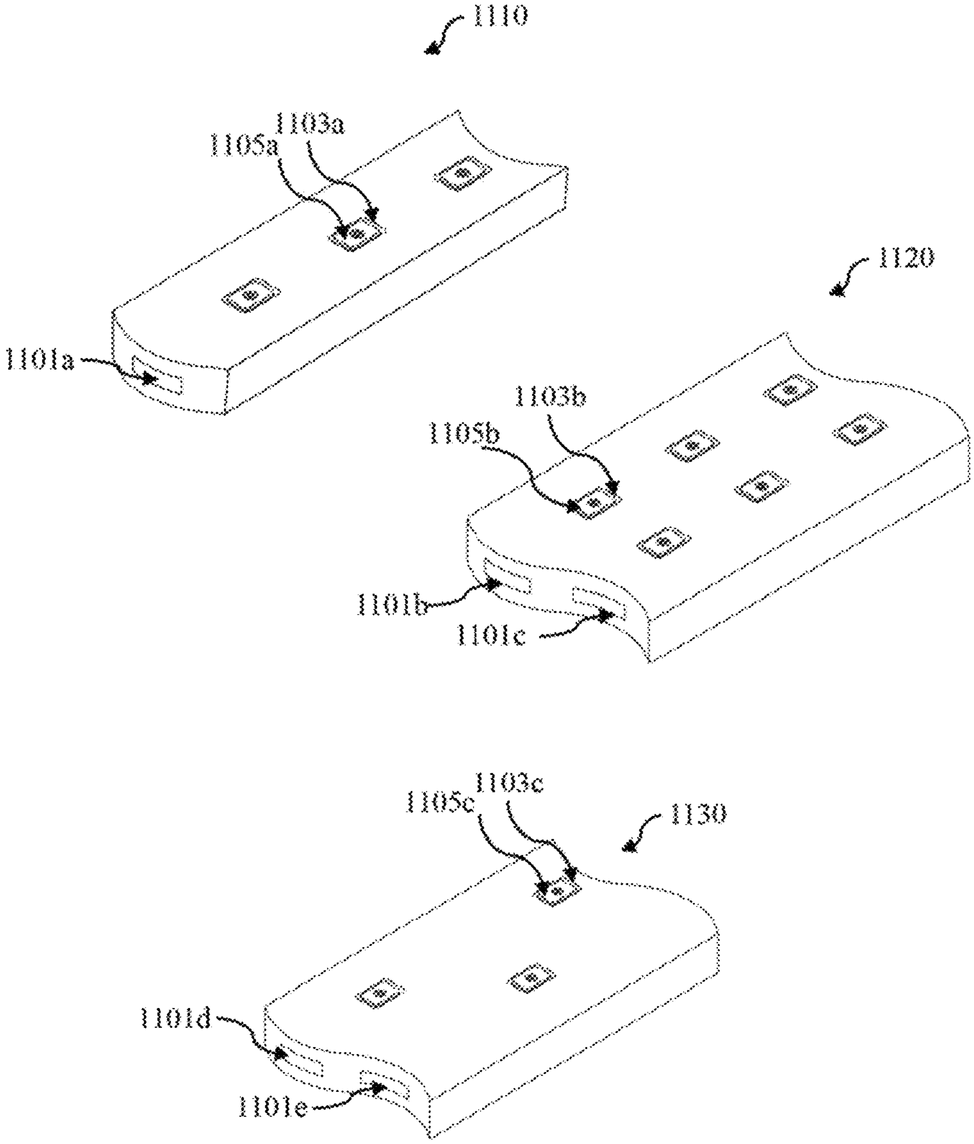
FIG. 11 shows examples of subarrays of audio sensors embedded in a wearable device in accordance with some embodiments of the disclosure.

FIG. 11 shows examples 1110, 1120, and 1130 of a textile structure in accordance with some embodiments of the disclosure. In some embodiments, each of textile structures 1110, 1120, and 1130 may represent a portion of a wearable device. Alternatively or additionally, each of textile structures 1110, 1120, and 1130 may be used in an individual wearable device. In some embodiments, each of textile structure may be included in a layer of textile structure as described in connection with FIG. 2A above.

As illustrated, the textile structures 1110, 1120, and 1130 can include one or more passages 1101*a*, 1101*b*, 1101*c*, 1101*d*, and 1101*e*. One or more portions of each of passages 1101*a-e* may be hallow. Passages 1101*b* and 1101*c* may or may not be parallel to each other. Similarly, passage 1101*d* may or may not be parallel to passage 1101*e*. Passages 1101*a*, 1101*b*, 1101*c*, 1101*d*, and 1101*e* may or may not have the same structure.

Textile structures 1110, 1120, and 1130 may also include one or more regions (e.g., 1103*a*, 1103*b*, 1103*c*, etc.) in which a voice communication system (e.g., voice communication systems 1105*a*, 1105*b*, 1105*c*, etc.) can be placed. Each of the regions may include a portion that may allow sound to go through to reach an audio sensor positioned in the region. The portion for sound to go through can be a through-hole. The shape of the region for sound to go through can include, but is not limited to alveoli arranged densely, circle, polygon, a shape determined based on the dimensions of the audio sensor, the like, or any combination thereof.

One or more regions and one or more passages may be arranged in a textile structure in any suitable manner. For example, a region and/or one or more portions of the region (e.g., regions 1103*a*, 1103*b*, and 1103*c*) may be a portion of a passage (e.g., passages 1101*a*, 1101*b*, and 1101*d*). As another example, a region may not have to be a part of a passage. More particularly, for example, the region may be positioned between a surface of the textile structure and the passage. In some embodiments, one or more sensors may be embedded in the region and/or the passage such that no portion of the sensor(s) and/or circuitry associated with the sensor(s) protrudes from the textile structure.

The shape of each of the regions can include, but is not limited to alveoli arranged densely, circle, polygon, the like, or any combination thereof. In some embodiments, the shape of a given region may be determined and/or manufactured based on the dimensions of a voice communication system positioned in the region. The method of manufacturing each of the regions can include, but is not limited to laser cutting, integral forming, the like, or any combination thereof.

The spatial structure of passages 1101*a-e* includes, but is not limited to cuboid, cylinder, ellipsoid, the like, or any combination thereof. The material manufacturing the textile structure can include, but is not limited to webbing, nylon, polyester fiber, the like, or any combination thereof.

In some embodiments, each of voice communication systems 1105*a*, 1105*b*, and 1105*c* may include one or more sensors (e.g., audio sensors), circuitry associated with the sensors, and/or any other suitable component. For example, each of voice communication systems 1105*a*, 1105*b*, and 1105*c* may include one or more voice communication system 1200 and/or one or more portions of voice communication system 1200 of FIG. 12. A voice communication system 1200 can be fixed to one surface of the passage 1101*a-e*. Thus, the connection between the voice communication system 1200 and the surface of the passage can be firm. The method for connecting voice communication system 1200 and the surface of the passage includes but is not limited to heating hot suspensoid, sticking, integral forming, fixing screws, the like, or any combination thereof.

Figure 12:
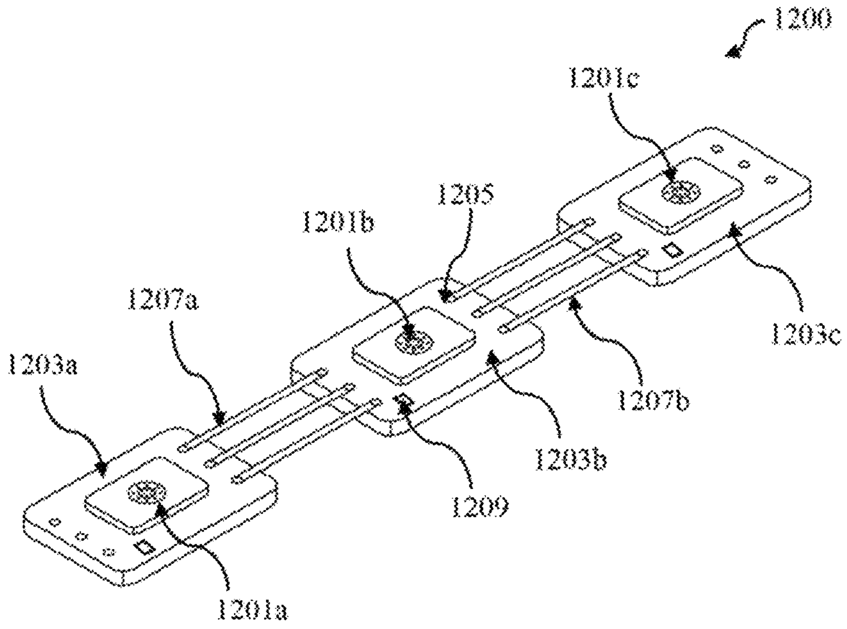
FIG. 12 shows an example of a voice communication system in accordance with some embodiments of the disclosure.

FIG. 12 shows an example 1200 of a voice communication system in accordance with some embodiments of the disclosure. The voice communication system 1200 can include one or more audio sensors 1201*a-c*, housings 1203*a-c*, soldered dots 1205, connectors 1207*a-b*, electrical capacitors 1209, and/or any other suitable component for implementing a voice communication system.

Each of audio sensors 1201*a*, 1201*b*, and 1201*c* can capture input acoustic signals and can convert the captured acoustic signals into one or more audio signals. In some embodiments, each of audio sensors 1201*a*, 1201*b*, and 1201*c* can be and/or include a microphone. In some embodiments, the microphone can include, but is not limited to, a laser microphone, a condenser microphone, a MEMS microphone, the like, or any combination thereof. For example, a MEMS microphone can be fabricated by directly etching pressure-sensitive diaphragms into a silicon wafer. The geometries involved in this fabrication process can be on the order of microns. In some embodiments, each of audio sensors 1201*a*, 1201*b*, and 1201*c* may be and/or include an audio sensor 110 as described above in conjunction with FIG. 1.

As illustrated in FIG. 12, audio sensors 1201*a*, 1201*b*, and 1201*c* and/or its associated circuits can be coupled to housings 1203*a*, 1203*b*, and 1203*c*, respectively. For example, an audio sensor may be coupled to a housing by a method that can include, but is not limited to soldering, sticking, integral forming, fixing screws, the like, or any combination thereof. The housing 1203 can be connected to the surface of the passage 1101 in FIG. 11. Each of housings 1203*a*, 1203*b*, and 1203*c* can be manufactured using any suitable material, such as plastic, fiber, any other non-conductive material, the like, or any combination thereof.

In some embodiments, housings 1203*a*, 1203*b*, and 1203*c* may be communicatively coupled to each other. For example, housing 1203*a* may be communicatively coupled to housing 1203*b* via one or more connectors 1207*a*. As another example, housing 1203*b* may be communicatively coupled to housing 1203*c* via one or more connectors 1207*b*. In some embodiments, each of connectors 1207*a-b* can be coupled to a housing 1203 of voice communication system 1200 by soldering (e.g., via a soldered dot 1205). In some embodiments, the audio sensors 1201*a*, 1201*b*, and 1201*c* mounted on the housing 1203 can be communicatively coupled to the circuit in the housing 1203 by soldering. Then, the audio sensors 1201 can be electrically connected to each other. Each of the connectors 1207*a-b* may be manufactured using any suitable material, such as copper, aluminum, nichrome, the like, or any combination thereof.

In the manufacturing process, one or more surfaces of the housing 1203*a-c* and/or the passage 1310 (shown in FIG. 13) can be coated with suspensoid. Then the communication system 1200 can be inserted into a passage. As a result, the suspensoid can be heated to fix the housing to the surface of the passage. Therefore, the audio sensor 1201*a-c* can be fixed to the textile structure. In some embodiments, in the textile structure, flexible redundancy along the longitudinal direction of the passages 201 (not shown in FIG. 11-12) can make the connector 1207 bend when the textile structure bends. The flexible redundancy can include, but is not limited to stretch redundancy, resilient structure, the like, or any combination thereof. For example, the length of the connectors 1207*a-b* connecting the two fixed points can be longer than the linear distance between the two fixed points, which can generate the stretch redundancy. In some embodiments, for generating the resilient structure, the shape of the connectors 1207*a-b* can include, but is not limited to spiral, serpentine, zigzag, the like, or any combination thereof.

In some embodiments, an electrical capacitor 1209 may be positioned on the housing to shunt noise caused by other circuit elements and reduce the effect the noise may have on the rest of the circuit. For example, the electrical capacitor 1209 can be a decoupling capacitor.

While a particular number of housings and audio sensors are illustrated in FIG. 12, this is merely illustrative. For example, voice communication system 1200 may include any suitable number of housings coupled to any suitable number of audio sensors. As another example, a housing of voice communication system 1200 may be coupled to one or more audio sensors and/or their associated circuits.

Figure 13:
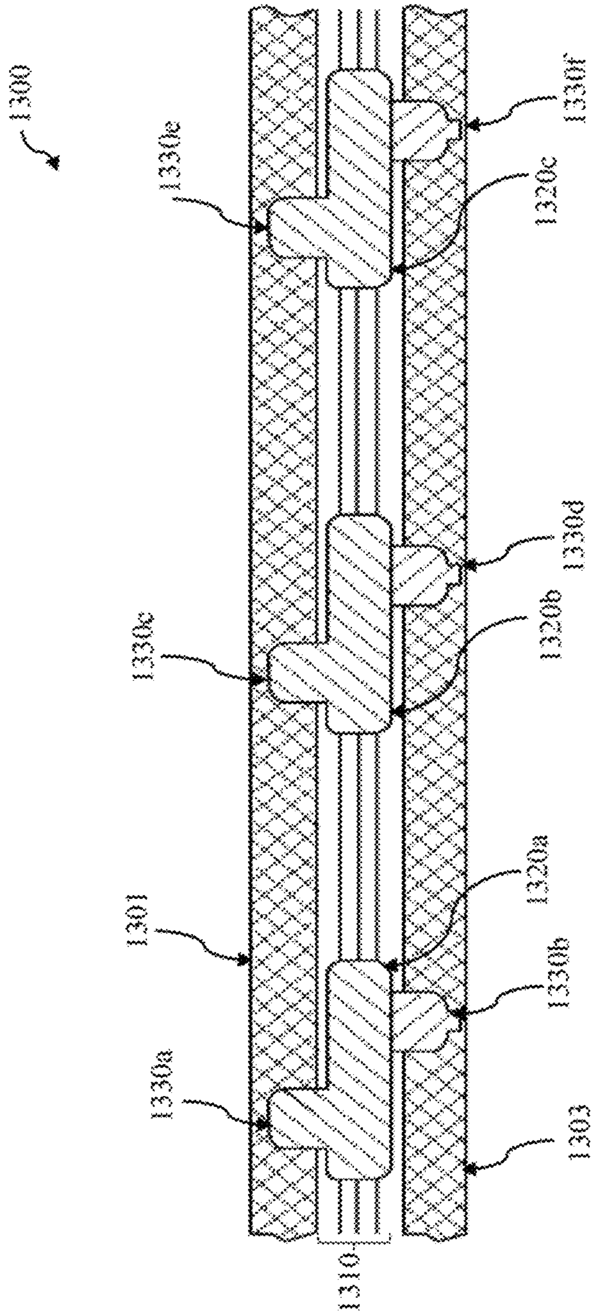
FIG. 13 shows an example of a sectional view of a wearable device in accordance with some embodiments of the disclosure.

FIG. 13 illustrates an example 1300 of a sectional view of a textile structure with embedded sensors in accordance with some embodiments of the disclosed subject matter. In some embodiments, textile structure 1300 may be and/or include a textile structure as illustrated in FIG. 11. Textile structure 1300 may include one or more portions of the voice communication system 1200 of FIG. 12. Textile structure 1300 may be included in a layer of textile structure as described in connection with FIG. 2A above.

As shown, textile structure 1300 may include a passage 1310 in which one or more housings 1320*a*, 1320*b*, and 1320*c* may be positioned. Housings 1320*a*, 1320*b*, and 1320*c* may be communicatively coupled to each other via one or more connectors 1207*a*, 1207*b*, etc.

Sensors 1330*a*, 1330*b*, 1330*c*, 1330*d*, 1330*e*, and 1330*f* may be coupled to one or more housings 1320*a-c*. For example, sensors 1330*a* and 1330*b* may be coupled to housing 1320*a*. Each of sensors 1330*a-f* may capture and/or generate various types of signals. For example, each of sensors 1330*a-f* may be and/or include an audio sensor that can capture acoustic signals and/or that can generate audio signals (e.g., an audio sensor 110 as described in conjunction with FIG. 1 above).

Each of sensors 1330*a-f* may be positioned between a first surface 1301 and a second surface 1303 of textile structure 1300. For example, one or more portions of sensor 1330*a* and/or its associated circuitry may be coupled to housing 1320*a* and may be positioned in passage 1310. Additionally or alternatively, one or more portions of sensor 1330*a* and/or its associated circuitry may be positioned in a region of textile structure 1300 that is located between surface 1301 and passage 1310. As another example, one or more portions of sensor 1330*b* may be coupled to housing 1320*a* and may be positioned in passage 1310. Additionally or alternatively, one or more portions of sensor 1330*b* and/or its associated circuitry may be positioned in a region of textile structure 1300 that is located between surface 1303 and passage 1310. In some embodiments, one or more sensors and/or their associated circuitry may be embedded between surfaces 1301 and 1303 of the textile structure with no parts protruding from any portion of the textile structure.

In some embodiments, surface 1301 may face a user (e.g., an occupant of a vehicle). Alternatively, surface 1303 may correspond to a portion of textile structure 1300 that may face to the user. In a more particular example, sensor 1330*a* may be and/or include an audio sensor. Sensor 1330*b* may be and/or include a biosensor that is capable of capturing information about the pulse, blood pressure, heart rate, respiratory rate, and/or any other information related to the occupant. In such an example, surface 1303 may face the user in some embodiments.

In some embodiments, the one or more sensors 1330*a-f* can be coupled to one or more housings 1320*a-c* by a method which can include, but is not limited to soldering, sticking, integral forming, fixing screws, the like, or any combination thereof. In some embodiments, housings 1320*a*, 1320*b*, and 1320*c* may correspond to housings 1203*a*, 1203*b*, and 1203*c* of FIG. 12, respectively.

The housings 1320*a-c* can be connected to each other electrically through connectors 1207. In some embodiments, the connectors 1207 can include flexible redundancy in the longitudinal direction. The flexible redundancy can include, but is not limited to stretch redundancy, resilient structure, the like, or any combination thereof. For example, the length of a connector 1207 connecting the two fixed points can be longer than the linear distance between the two fixed points, which can generate the stretch redundancy. In some embodiments, for generating the resilient structure, the shape of the connectors can include, but is not limited to spiral, serpentine, zigzag, the like, or any combination thereof.

The housing 1320*a-c*'s surface with no attachments can be coated with hot suspensoid.

Figure 14:
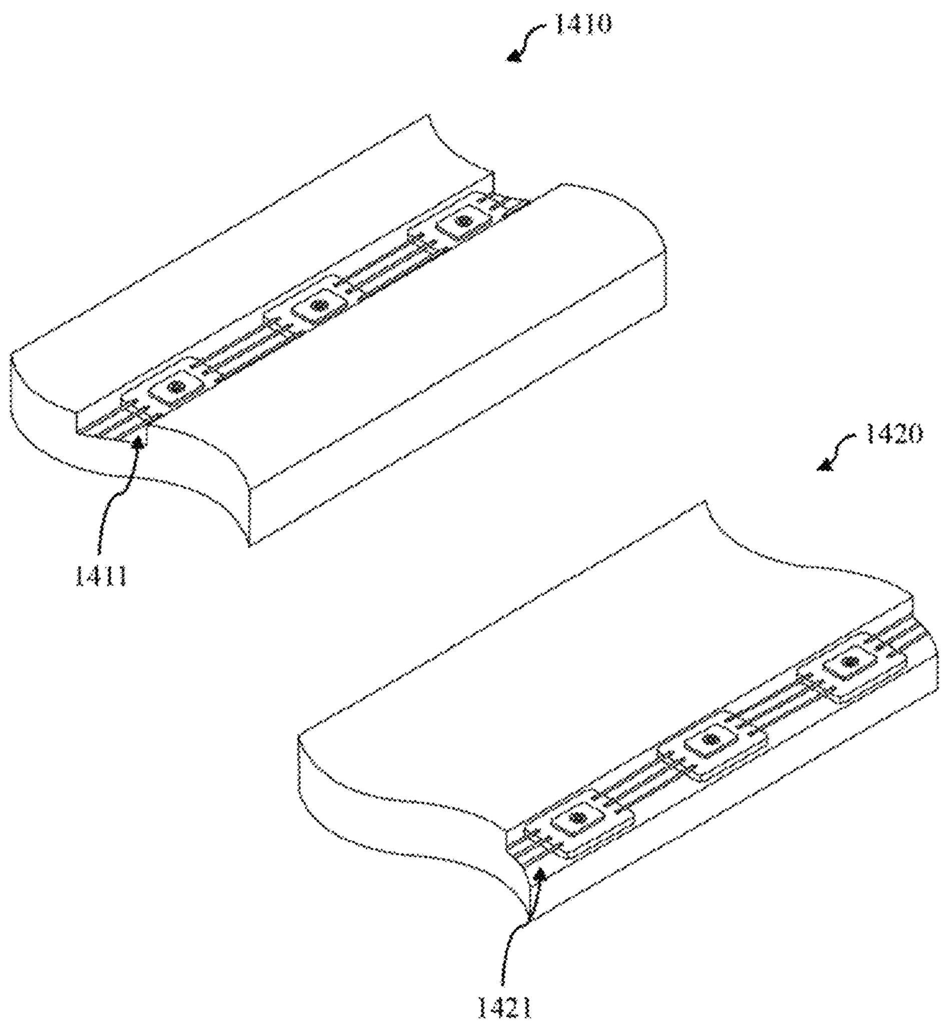
FIG. 14 shows examples of textile structures that can be used in a wearable device in accordance with some embodiments of the disclosure.

FIG. 14 illustrates examples 1410 and 1420 of a textile structure with embedded sensors for implementing a voice communication system 1200 in accordance with some embodiments of the disclosed subject matter. In some embodiments, each of textile structures 1310 and 1320 may represent a portion of a wearable device (e.g., a seat belt, a safety belt, a film, etc.). Alternatively or additionally, textile structures 1410 and 1420 may represent portions of different wearable devices. In some embodiments, each of textile structures 1410 and 1420 can be included in a layer of textile structure as described in connection with FIG. 2A above.

As shown, textile structure 1410 include a passage 1411. Similarly, textile structure 1420 may include a passage 1421. A voice communication system, such as one or more portions of and/or one or more voice communication systems 1200, may be positioned in passages 1411 and/or 1421.

Each of passages 1411 and 1421 can be in the middle part of the textile structure. In 1420, some of the one or more passages can be in the edge of the textile structure near the human body sound source. For example, the human body sound source can refer to human mouth.

In some embodiments, the one or more passages 1411 and 1421 can be manufactured in the textile structure. The distance between the adjacent passages 1411 can be the same or different. The starting point and the termination of multiple passages can be the same or different.

In the manufacturing process, the voice communication system 1200 can be placed in the passages 1411 and 1421. Then the blank area of the passage 1411 without occupants can be filled with infilling. As a result, the voice communication system 1200 can be fixed to the passage 1411 by injection molding of the infilling. The infilling can include, but is not limited to silica gel, silicon rubber, native rubber, the like, or any combination thereof. In some embodiments, in the filling process, the connectors 1207 covered with infilling can be used. Therefore the audio sensors 1201 and the housing 1203 can be filled with infilling in the filling process. Yet in other embodiments, the connectors 1207, the audio sensors 1201 and the housing 1203 can be filled with infilling in one filling process.

In some embodiments, the infilling can generate a region for sound to go through along the outer surface profile of the audio sensor 1201. For example, the region can be the region 1103 shown in FIG. 11. After the injection molding of the infilling, the thicknesses of different parts of the stuff in the passage 1411 can be less than and/or greater than the corresponding depth of the passage 1411. The depth of the passage can vary in different positions. Therefore the stuff in the passage 1411 can include parts protruding and/or not protruding from the passage 1411.

Figure 15:
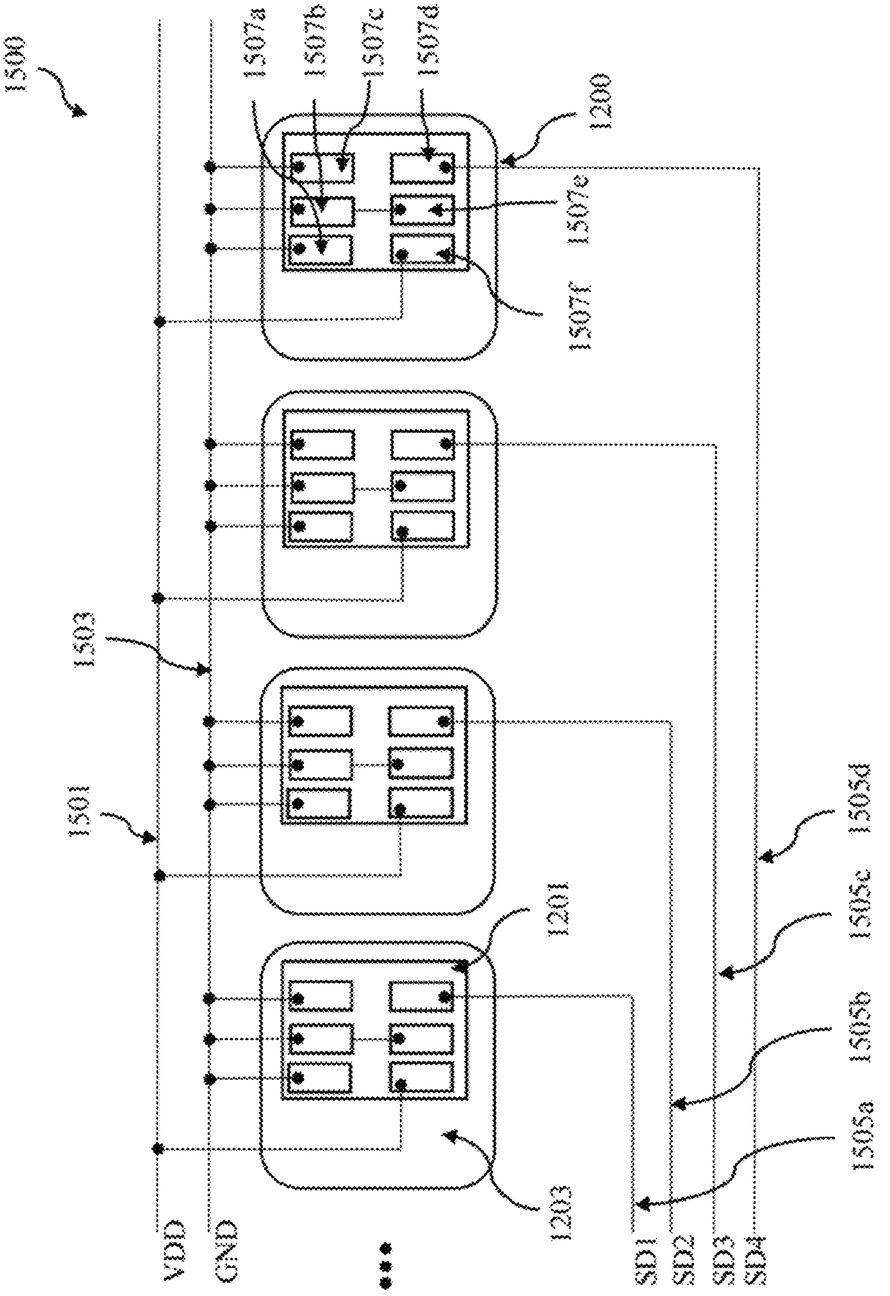
FIGS. 15 and 16 are examples of circuitry associated with one or more sensors in accordance with some embodiments of the disclosure.

FIG. 15 shows an example 1500 of a wiring of a voice communication system 1200 in accordance with some embodiments of the disclosure. The wiring 1500 can include one or more VDD connectors 1501, GND connectors 1503, SD data connectors 1505, audio sensors 1201 and housings 1203 and/or any other suitable component for implementing a voice communication system.

The audio sensor 1201 can include one or more pins 1507. For example, the audio sensor 203 can include six pins 1507*a-f*. The pins of each audio sensor 1201 can be the same or different. One or more pins can be coupled to the VDD connector 1501 and the GND connector 1503. Then, power can be supplied to the audio sensor 1201. For example, three pins 1507*a-c* can be coupled to GND connector 1503 and one pin 1507*f* can be coupled to the VDD connector 1501. One or more pins 1507 can be coupled to each other. In some embodiments, pins 1507*b* and 1507*e* can be coupled to each other. The audio sensor 1201 can include one or more pins 1507 to output signals. For example, the pin 1507*d* can be coupled to SD data connector 1505 to output signals. In FIG. 15 the wiring 1500 can include four audio sensors 1201 and four corresponding SD data connectors 1505*a*, 1505*b*, 1505*c*, 1505*d*. In other embodiments, the number of audio sensors 1201 and the number of the SD data connectors 1505 can be variable. Also, the number of audio sensors 1201 and the number of the SD data connectors can be the same or different.

The connection between the VDD connectors 1501, the GND connectors 1503, the SD data connectors 1505 and the housing 1203 can be in series and/or in parallel. In some embodiments, the housing 1203 can have one or more layers. The cross connection of the VDD connectors 1501, the GND connectors 1503 and the SD data connectors 1505 can be achieved in the housing 1203. Then the VDD connectors 1501, the GND connectors 1503 and the SD data connectors 1505 can be parallel to each other. The wiring 1500 of a voice communication system 1200 can be inserted to the passage 201 (not shown in FIG. 15) of a textile structure and fixed to the surface of the passage 201.

Figure 16:
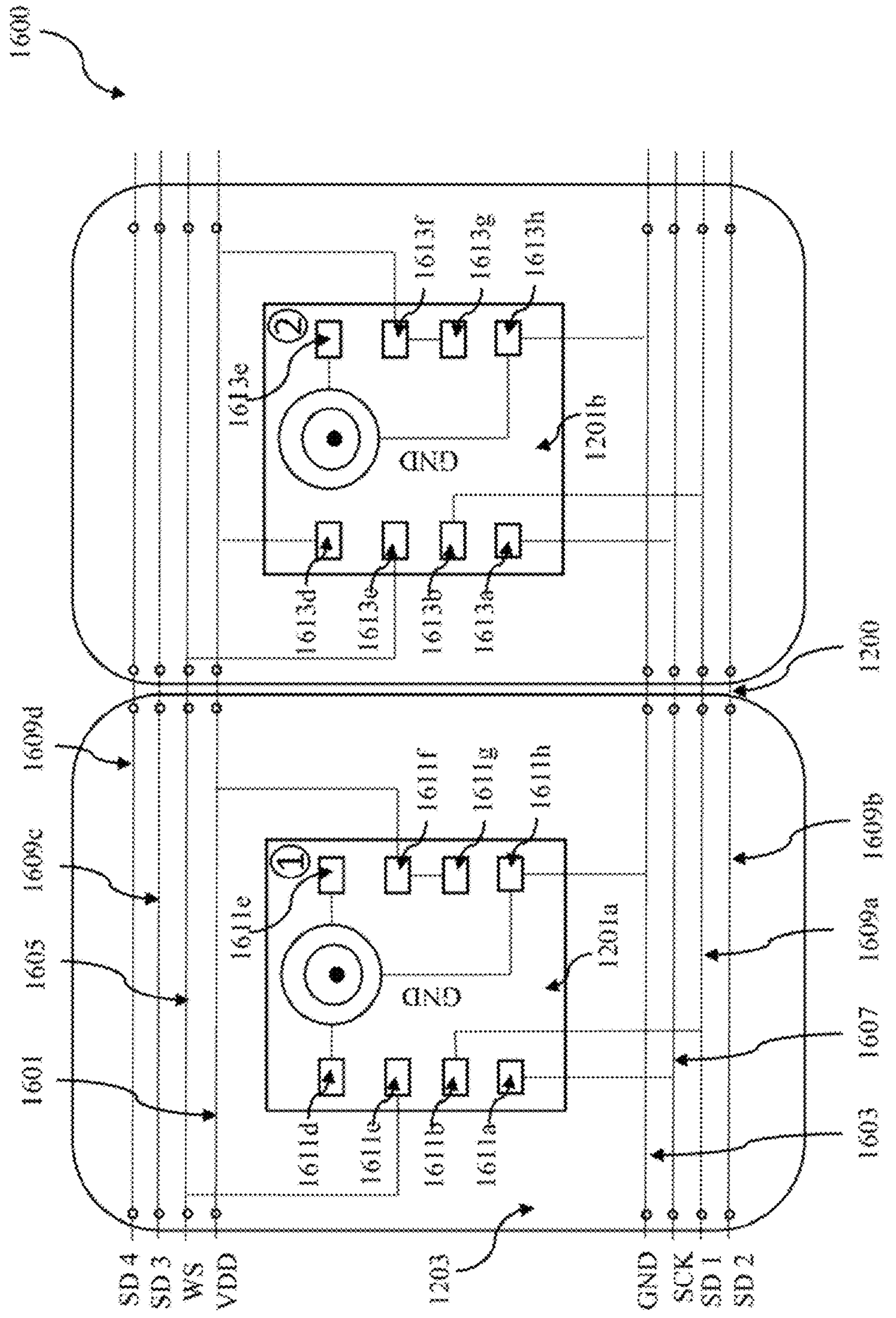

FIG. 16 shows an example 1600 of a wiring of a voice communication system 1200 in accordance with some embodiments of the disclosure. The wiring 1600 can include one or more VDD connectors 1601, GND connectors 1603, WS bit clock connector 1605, SCK sampling clock connector 1607, SD data connectors 1609, audio sensors 1201*a-b* and housings 1203 and/or any other suitable components for implementing a voice communication system.

The audio sensors 1201*a-b* can include one or more pins 1611 and 1613. For example, the audio sensor 1201*a* can include eight pins 1611*a-h*. The audio sensor 1201*b* can include eight pins 1613*a-h*. One or more pins can be coupled to the VDD connector 1601 and the GND connector 1603. Then, power can be supplied to the audio sensor 1201*a* and 1201*b*. For example, in 1201*a*, the pin 1611*f* can be coupled to the VDD connector 1601 and the pin 1611*h* can be coupled to the GND connector 1603. In 1201*b*, 1613*d* and 1613*f* can be coupled to the VDD connector 1601 and the pin 1613*h* can be coupled to the GND connector 1603. One or more pins 1611 can be coupled to each other. One or more pins 1613 can also be coupled to each other. In some embodiments, in 1201*a* the pin 1611*f* can be coupled to 1611*g*. 1611*d* and 1611*e* can be coupled to 1611*h*. In 1201*b* the pin 1613*f* can be coupled to 1613*g*. 1613*e* can be coupled to 1613*h*.

The WS bit clock connector 1605 and the SCK sampling clock connector 1607 can supply one or more clock signals. In 1201*a* the pin 1611*c* can be coupled to the WS bit clock connector 1605 and the pin 1611*a* can be coupled to the SCK sampling clock connector 1607. In 1201*b* the pin 1613*c* can be coupled to the WS bit clock connector 1605 and the pin 1613*a* can be coupled to the SCK sampling clock connector 1607.

The audio sensor 1201 can include one or more pins to output signals. One or more pins can be coupled to the SD data connector 1609. One or more SD data connectors 1609 can be coupled to the pin 1611 and/or 1613. For example, the pins 1611*b* in 1201*a* and 1613*b* in 1201*b* can be coupled to the SD data connector 1609*a* to output signals. In FIG. 16 the wiring 1600 can include four SD data connectors 1609*a*, 1609*b*, 1609*c* and 1609*d*. Other audio sensors 1201 (not shown in FIG. 16) can be coupled to the SD data connectors 1609. In other embodiments, the number of audio sensors 1201 and the number of the SD data connectors 1609 can be variable. Also, the two numbers can be the same or different.

The VDD connectors 1601, the GND connectors 1603 and the SD data connectors 1609 can be coupled to the housing 1203 in series and/or in parallel. In some embodiments, the housing 1203 can have one or more layers. The cross connection of the VDD connectors 1601, the GND connectors 1603 and the SD data connectors 1609 can be achieved in the housing 1203. Thus, the VDD connectors 1601, the GND connectors 1603 and the SD data connectors 1609 can be parallel to each other. The wiring 1600 of a voice communication system 1200 can be inserted to the passage 201 (not shown in FIG. 16) of a textile structure and fixed to the surface of the passage 201.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determine," "embedding," "placing," "positioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

What is claimed is:

1. A system for voice communication, comprising:

a first audio sensor that:

captures an acoustic input; and generates a first audio signal based on the acoustic input, wherein the first audio sensor is positioned in a first passage located between a first surface and a second surface of a textile structure, and a second audio sensor that generates a second audio signal based on the acoustic input, wherein the textile structure comprises a second passage, and wherein at least a portion of the second audio sensor is positioned in the second passage.

2. The system of claim 1, wherein the first audio sensor is a microphone fabricated on a silicon wafer.

3. The system of claim 1, wherein the first audio sensor is positioned in a region located between the first surface and the second surface of the textile structure.

4. The system of claim 1, wherein the first passage is parallel to the second passage.

5. The system of claim 1, the first audio sensor and the second audio sensor forms a differential subarray of audio sensors.

6. The system of claim 1, wherein the system further comprises a processor that generates a speech signal based on the first audio signal and the second audio signal.

7. The system of claim 6, wherein, to generate the speech signal, the processor further:

generates an output signal by combining the first audio signal and the second audio signal; and performs echo cancellation on the output signal.

8. The system of claim 7, wherein, to perform the echo cancellation, the processor further:

constructs a model representative of an acoustic path; and estimates a component of the output signal based on the model.

9. The system of claim 1, wherein the first audio sensor and the second audio sensor are embedded in a first layer of the textile structure.

10. The system of claim 9, wherein at least a portion of circuitry associated with the first audio sensor is embedded in a second layer of the textile structure.

11. The system of claim 1, wherein a distance between the first surface and the second surface of the textile structure is not greater than 2.5 mm.

12. The system of claim 1, wherein the first audio sensor does not protrude from the textile structure.

13. The system of claim 1, further comprising a biosensor positioned between the first surface and the second surface of the textile structure.

14. A method for voice communication, comprising:

receiving a plurality of audio signals produced by a microphone array, wherein the microphone array comprises a first microphone subarray, and wherein the plurality of audio signals comprises a first audio signal produced by the first microphone subarray;

performing spatial filtering on the plurality of audio signals to generate a plurality of spatially filtered signals;

determining an estimate of a desired component of the first audio signal based on the plurality of audio signals;

constructing at least one noise reduction filter based on the estimate of a desired component of the first audio signal;

generating a noise reduced signal based on the at least one noise reduction filter; and performing, by a processor, echo cancellation on the plurality of audio signals to generate at least one speech signal, wherein constructing the at least one noise reduction filter further comprises:

determining an error signal based on the estimate of the desired component of the first audio signal; and solving an optimization problem based on the error signal.

15. The method of claim 14, wherein constructing the at least one noise reduction filter further comprises:

determining a first power spectral density of the first audio signal;

determining a second power spectral density of the desired component of the first audio signal;

determining a third power spectral density of a noise component of the first audio signal; and constructing the at least one noise reduction filter based on at least one of the first power spectral density, the second power spectral density, or the third power spectral density.

16. The method of claim 14, wherein the at least one noise reduction filter comprises a plurality of non-causal filters corresponding to a plurality of audio sensors in the microphone array.

17. The method of claim 14, further comprising updating the noise reduction filter using a single-pole recursion technique.

18. The method of claim 14, wherein performing the noise reduction further comprises applying the noise reduction filter to the spatially filtered signals.

19. The method of claim 14, wherein performing the echo cancellation comprises:

receiving a plurality of loudspeaker signals produced by a plurality of loudspeakers;

applying a non-linear transformation to each of the loudspeaker signals to generate a plurality of transformed loudspeaker signals;

constructing a plurality of filters based on the transformed loudspeaker signals, wherein each of the plurality of filters represents an acoustic path corresponding to one of the plurality of loudspeaker signals; and applying the plurality of filters to the transformed loudspeaker signals to estimate an echo component of the first audio signal.

20. The method of claim 19, wherein applying the non-linear transformation to a first loudspeaker signal of the plurality of loudspeaker signals comprises adding a half-wave rectified version of the first loudspeaker to the first loudspeaker signal.

21. The method of claim 19, wherein constructing the plurality of filters comprises:

determining a posteriori error signal based on the first audio signal;

determining a cost function based on the posterior error signal; and minimizing the cost function.

22. The method of claim 14, wherein performing the echo cancellation further comprises:

determining whether an occurrence of double-talk was detected for a previous frame of the first audio signal;

calculating a forgetting factor based on the determination; and performing double-talk detection for a current frame of the first audio signal based on the forgetting factor.

23. The method of claim 14, wherein the first microphone subarray comprises a first audio sensor and a second audio sensor, and wherein performing spatial filtering on the plurality of output signals comprises:

applying a time delay to a second audio signal produced by the second audio sensor to generate a delayed signal;

combining the first audio signal and the delayed signal to generate a combined signal, wherein the first audio signal is produced by the first audio sensor; and applying a low-pass filter to the combined signal.

* * * * *